(12) United States Patent
Kim et al.

(10) Patent No.: US 12,305,801 B2
(45) Date of Patent: May 20, 2025

(54) SMART WALL

(71) Applicant: LG ELECTRONICS INC., Seoul (KR)

(72) Inventors: Yunjoo Kim, Seoul (KR); Youngkyoung Kim, Seoul (KR); Taeho Kim, Seoul (KR); Hyunki Kim, Seoul (KR); Junghan Ryu, Seoul (KR); Jaemyo Shim, Seoul (KR); Juyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 449 days.

(21) Appl. No.: 17/634,718

(22) PCT Filed: Aug. 14, 2020

(86) PCT No.: PCT/KR2020/095117
§ 371 (c)(1),
(2) Date: Feb. 11, 2022

(87) PCT Pub. No.: WO2021/029762
PCT Pub. Date: Feb. 18, 2021

(65) Prior Publication Data
US 2022/0290805 A1 Sep. 15, 2022

(30) Foreign Application Priority Data

Aug. 14, 2019 (KR) .................. 10-2019-0099233
Aug. 14, 2019 (KR) .................. 10-2019-0099234
(Continued)

(51) Int. Cl.
*E06B 9/42* (2006.01)
*E04B 2/76* (2006.01)
(Continued)

(52) U.S. Cl.
CPC ............ *F16M 13/022* (2013.01); *E04B 2/76* (2013.01); *E06B 9/42* (2013.01); *G06F 1/1601* (2013.01);
(Continued)

(58) Field of Classification Search
None
See application file for complete search history.

(56) References Cited

U.S. PATENT DOCUMENTS 4,631,881 A 12/1986 Charman
6,125,905 A 10/2000 Woodside et al.
(Continued)

FOREIGN PATENT DOCUMENTS

CN 297803838 U 9/2018
CN 208905483 U 5/2019
(Continued)

*Primary Examiner* — Phi D A
(74) *Attorney, Agent, or Firm* — Birch, Stewart, Kolasch & Birch, LLP

(57) ABSTRACT

A smart wall comprises: a frame structure comprising a mounting cell; a display device installed in the mounting cell; a driving roller provided above the mounting cell; a screen which is wound around the driving roller and comprises a first lower side portion located at the front side of the display device and a second lower side portion located at the rear side of the display device; and a motor for moving the screen wound around the driving roller, to thereby enable the screen, which covers the front surface of the display device, to receive the force of the motor without slipping, to thus be stably moved upward or downward.

29 Claims, 23 Drawing Sheets

(30) Foreign Application Priority Data

Aug. 14, 2019 (KR) ........................ 10-2019-0099235
Aug. 19, 2019 (KR) ........................ 10-2019-0101096

(51) Int. Cl.
 *F16M 13/02* (2006.01)
 *G06F 1/16* (2006.01)
 *E04B 2/74* (2006.01)

(52) U.S. Cl.
 CPC ..... *E04B 2/7457* (2013.01); *E04B 2002/7483* (2013.01)

(56) References Cited

U.S. PATENT DOCUMENTS

| | | | |
|---|---|---|---|
| 6,257,305 B1 * | 7/2001 | Mullet | E06B 9/42 |
| | | | 242/375.3 |
| 6,901,987 B1 | 6/2005 | Graham | |
| 2006/0244700 A1 * | 11/2006 | Sano | G06F 1/1601 |
| | | | 248/920 |
| 2008/0309833 A1 | 12/2008 | Nakamura et al. | |
| 2017/0321481 A1 * | 11/2017 | Ashkanmehr | E06B 9/70 |
| 2018/0222166 A1 * | 8/2018 | Swiszcz | B32B 27/12 |
| 2019/0226275 A1 * | 7/2019 | Miller | E06B 9/66 |
| 2020/0032581 A1 * | 1/2020 | Englert, Jr. | E06B 9/44 |

FOREIGN PATENT DOCUMENTS

| | | |
|---|---|---|
| EP | 3239429 A1 | 11/2017 |
| JP | 6-123919 A | 5/1994 |
| JP | 2008-208706 A | 9/2008 |
| KR | 20-0378793 Y1 | 3/2005 |
| KR | 20-0445370 Y1 | 7/2009 |
| KR | 20-0448707 Y1 | 5/2010 |
| KR | 20-2012-0008562 U | 12/2012 |
| KR | 10-1491104 B1 | 2/2015 |
| KR | 10-2019-0058799 A | 5/2019 |
| SE | 508 048 C2 | 11/1997 |

* cited by examiner (a)    (b)

FIG. 6
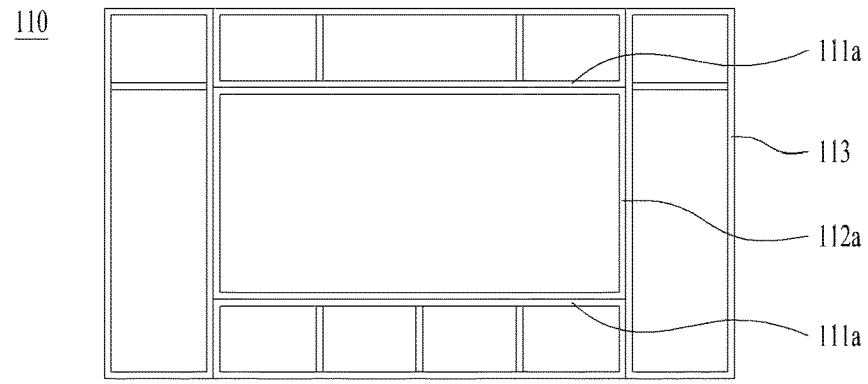
(a)
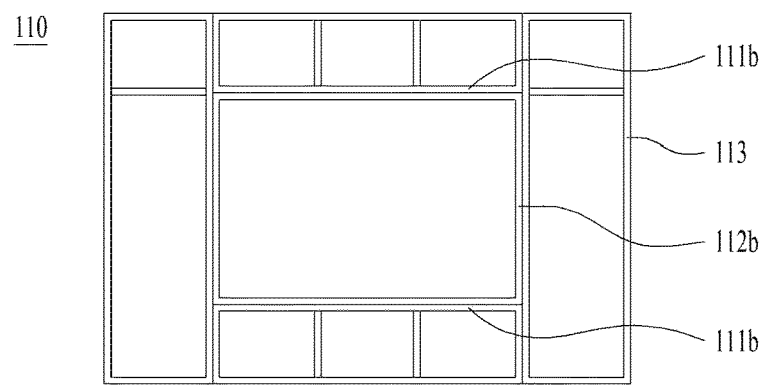
(b)
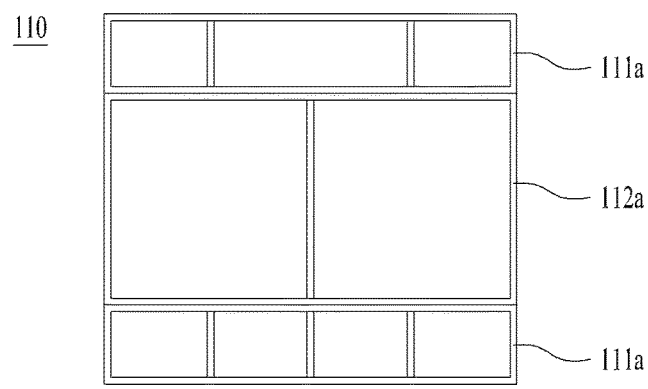
(c)

FIG. 9
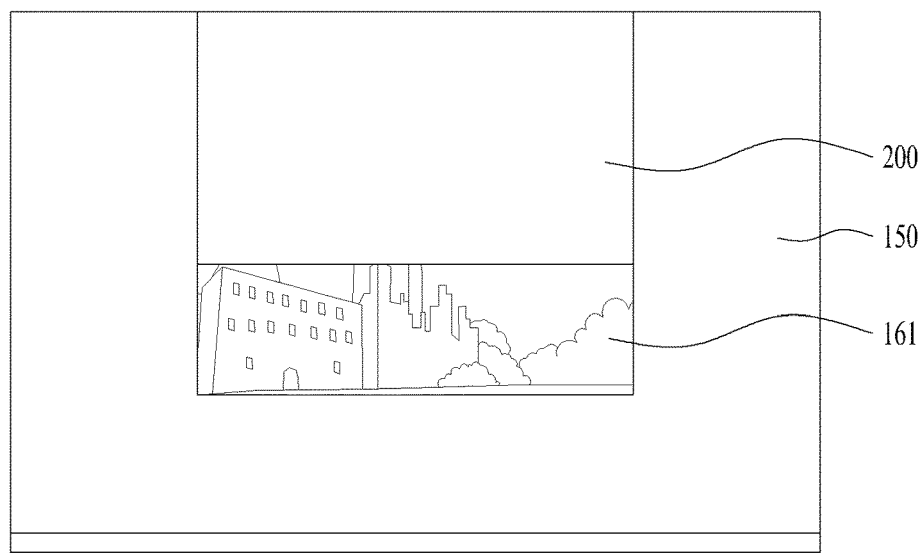
(a)
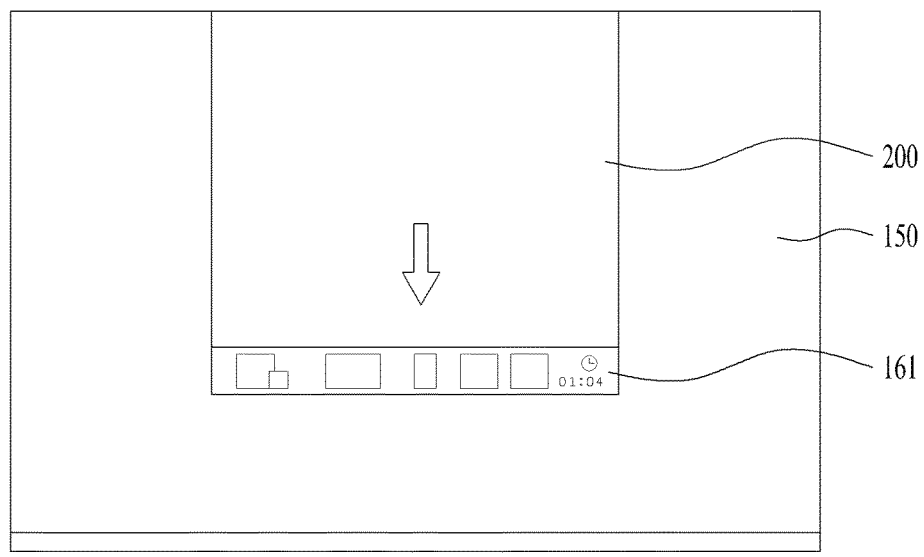
(b)

FIG. 11
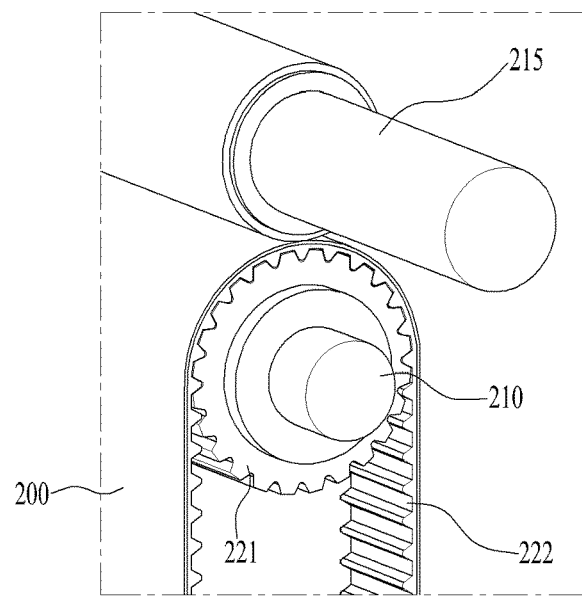
(a)
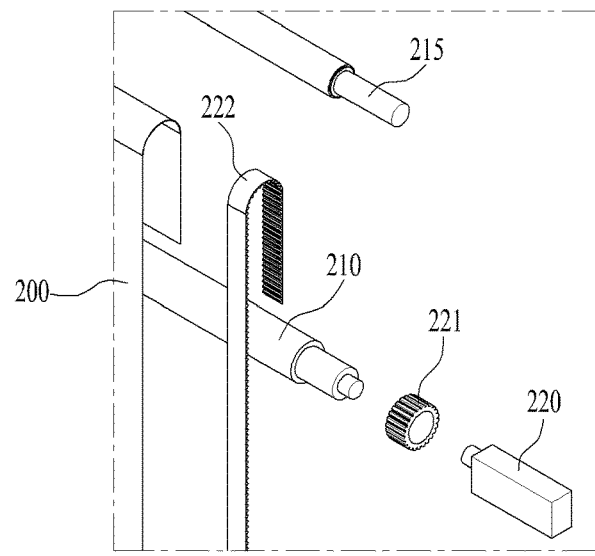
(b)

FIG. 23
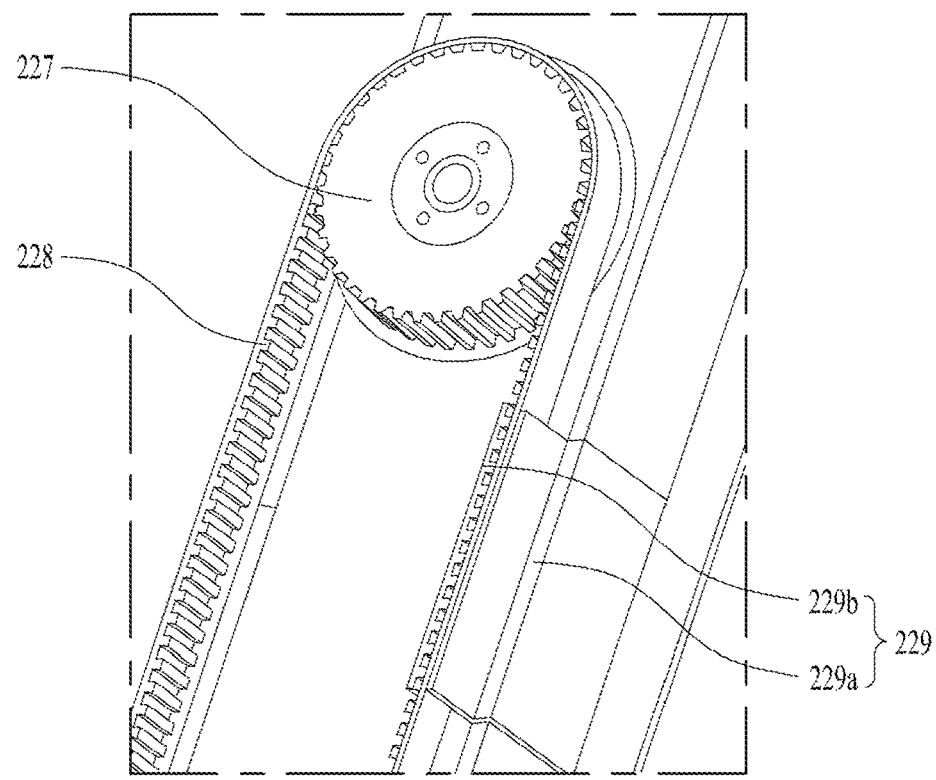
(a)
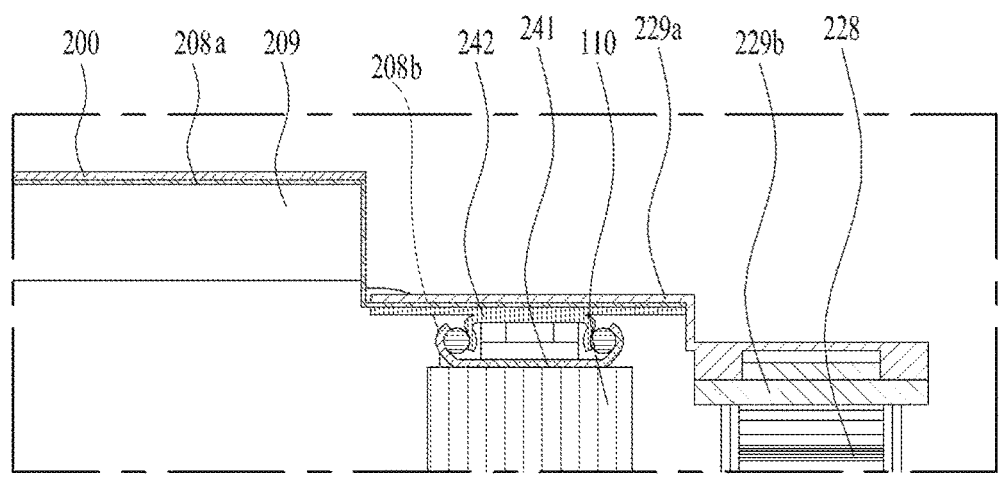
(b)

SMART WALL

CROSS REFERENCE TO RELATED APPLICATIONS

This application is the National Phase of PCT/KR2020/095117 filed on Aug. 14, 2020, which claims priority under 35 U.S.C. § 119 (a) to Patent Application Nos. 10-2019-0099233; 10-2019-0099234; 10-2019-0099235 and 10-2019-0101096 filed in the Republic of Korea on Aug. 14, 2020; Aug. 14, 2020; Aug. 14, 2020 and Aug. 19, 2020 respectively, all of which are hereby expressly incorporated by reference into the present application.

TECHNICAL FIELD

The present disclosure relates to a wall on which a multimedia device, such as a TV and a loudspeaker, and a home appliance are mounted, and a unitized smart wall.

BACKGROUND ART

Recently, as the infrastructure in which all media devices and home appliances at home beyond the smartphone are connected to the Internet is built, the smart home is emerging as a keyword of a new smart ecosystem. In particular, user experiences and values accumulated through smartphones, which are personal media devices, have begun to extend to other devices.

As various attempts such as building a home network system were made in order to make media devices and home appliances to interoperate with each other, the number of electronic devices at home has increased and there is a hassle of connecting the devices one by one.

In particular, it is a recent trend to minimize the number of pieces of furniture and electronics that are placed near the living room wall, around which the TV is usually placed, to keep a neat appearance of the living room wall, which represents the house. In addition, where there are children in a house, they may be pushed over or bumped and injured due to a TV table or a loudspeaker placed in the living room. Therefore, it is important to reduce the number of pieces of furniture and electronics protruding into the space of the living room.

DISCLOSURE

Technical Problem

The present disclosure is to provide a smart wall that may stably drive a screen located on a front surface of a frame on which a multimedia device, such as a TV and a speaker, and a home appliance are mounted.

In addition, the present disclosure is to provide a smart wall that may easily fasten and deform a frame.

Technical Solutions

Provided is a smart wall including a frame structure having a mounting cell defined therein, a display device disposed in the mounting cell, a driving roller positioned at an upper portion of the mounting cell, a screen including a first lower portion wound around the driving roller and positioned in front of the display device and a second lower portion positioned at the rear of the display device, and a motor for moving the screen wound around the driving roller.

The smart wall may further include a timing gear rotating by receiving a rotational force of the motor and including first teeth on an outer surface thereof, and a timing belt coupled to a first surface of the screen in contact with the driving roller and including second teeth engaged with the first teeth.

The timing belt may contain a ductile material.

The timing gear may be located at each of one end and the other end of the driving roller, and the timing belt may be located at each of both ends in a horizontal direction of the screen.

The smart wall may further include a load beam coupled to a first surface of a lower end of the screen.

An end of the timing belt may be located above the load beam.

The load beam may have a length corresponding to a horizontal length of the screen.

An outer surface of the driving roller may be coated with a silicone or rubber material.

The smart wall may further include an auxiliary roller adjacent to the driving roller and extending in a direction parallel to the driving roller, and the screen may pass through a space defined between the driving roller and the auxiliary roller.

The screen may include a first fabric, and a metal mesh positioned on a first surface of the first fabric.

The metal mesh may include a plurality of mesh holes extending long in a horizontal direction.

The mesh holes may be arranged in an array in the horizontal direction and a vertical direction, and two vertically adjacent mesh holes may be staggered.

An end of the first fabric may surround an end of the metal mesh and may be directed to face a first surface of the metal mesh.

The metal mesh may contain a SUS.

The screen may further include a second fabric located on a first surface of the metal mesh.

The smart wall may further include a timing gear rotating by receiving a rotational force of the motor and including first teeth on an outer surface thereof, a timing chain including holes defined therein respectively corresponding to the first teeth, and a connector for connecting the timing chain and the screen to each other.

The timing chain may contain a ductile material.

The timing gear may be coupled to the driving roller and rotate together with the driving roller.

The timing gear may include a pair of timing gears to be respectively coupled to both ends of the driving roller, and the timing chain may include a pair of timing chains on both sides in a horizontal direction of the screen.

The smart wall may further include a spur gear for transmitting the rotational force of the motor to the driving roller and the timing gear.

The connector may be fastened to the second lower portion, and the smart wall may further include a load beam coupled to the first lower portion.

The connector may include a first connector fastened to the first lower portion and a second connector fastened to the second lower portion.

A diameter of a portion of the driving roller in contact with the screen may be a times larger than a diameter of the timing gear, and the number of rotations of the timing gear may be a times greater than the number of rotations of the driving roller.

The smart wall may further include an art wall being flush with the first lower portion of the screen and located next to the screen, and the timing chain may be located on a rear surface of the art wall.

The smart wall may further include a rail coupled to the frame structure and extending in a vertical direction, and a bearing inserted into the rail to move along the rail in the vertical direction and fastened with the first lower portion of the screen, and when the driving roller rotates, the first lower portion of the screen may move in the vertical direction and the bearing may move in the vertical direction along the rail.

The smart wall may further include a screen bracket coupled to the first lower portion of the screen, and the bearing may be coupled to the screen bracket.

The screen bracket may further include a wing portion extending in a lateral direction from the screen, and the bearing may be fastened to the wing portion.

The wing portion may extend to form a step rearwardly from a main body coupled to the first lower portion of the screen, and the smart wall may further include an art wall located next to the screen and covering the wing portion and the rail.

The bearing and the rail may respectively include a plurality of bearings and a plurality of rails arranged on both sides in a horizontal direction of the screen.

The frame structure may include a horizontal frame positioned on top of the mounting cell, the driving roller may include a first roller and a second roller extending in a horizontal direction, and the first roller and the second roller may be arranged side by side in a front and rear direction of the frame structure.

The smart wall may further include a wire having one end coupled to the second lower portion of the screen, a rotating portion onto which the other end of the wire is wound, and a motor for providing a rotational force to the rotating portion.

The wire and the rotating portion may respectively include a plurality of wires and a plurality of rotating portions spaced apart from each other in a horizontal direction, and the motor may provide a rotational force to the plurality of rotating portions at the same time.

The smart wall may further include a load beam coupled to the first lower portion of the screen.

The smart wall may further include a pair of rotary pulleys coupled to the frame structure and arranged in the vertical direction, a motor for applying a rotational force to the rotary pulleys, and a closed band having both ends respectively fitted with the pair of rotary pulleys, the screen may include a fastener for fastening the closed band to at least one of the first lower portion and the second lower portion, and when the motor is driven, as the rotary pulley rotates and the closed band moves, the screen may move in the vertical direction.

The smart wall may further include a rotating portion connected to the rotary pulley, and a spur gear for transmitting a rotational force of the motor to the rotating portion.

The rotary pulley and the closed band may respectively include the plurality of rotary pulleys and a plurality of closed bands located on both sides in a horizontal direction of the screen, and the pair of rotary pulleys may be respectively coupled to both sides of the rotating portion.

The rotary pulley may include first teeth protruding from an outer surface thereof, and the closed band may include second teeth engaged with the first teeth.

The fastener may include a first bracket coupled to one surface of the closed band, a second bracket coupled to the other surface of the closed band having the second teeth formed thereon, and a fastening screw for fastening the first bracket and the second bracket to each other through the first bracket and the second bracket, and the second bracket may further include irregularities corresponding to a shape of the second teeth.

Advantageous Effects

A smart wall according to the present disclosure may be installed on a wall surface at the same vertical level as a multimedia device such as a TV and an audio mounted on the wall, and may provide a neat appearance by covering an electronic appliance with a screen when the electronic appliance is not used.

A screen for covering a front surface of a display device may not slide, and may move stably in a vertical direction by receiving power of a motor.

In addition, it is possible to reduce a sense of heterogeneity with an art wall fixed to a frame structure because a screen is not lifted or wrinkled by having a load beam and a metal mesh.

In addition, there is no need to move an unused seasonal appliance to a separate mounting cell, which is advantageous in terms of space security.

Further scope of applicability of the present disclosure will become apparent from the detailed description below. Various changes and modifications within the spirit and scope of the present disclosure may be clearly understood by those skilled in the art, and therefore, the detailed description and specific embodiments, such as preferred embodiments of the present disclosure, should be understood as given by way of example only.

DESCRIPTION OF DRAWINGS

FIG. 6 is a view illustrating a frame module of the smart wall according to an embodiment.

FIG. 9 is a view illustrating a change in a region where a display device is exposed on a front surface of a smart wall according to an embodiment of the present disclosure.

FIG. 11 is a view showing a driver according to an embodiment of the present disclosure.

FIG. 23 is a view illustrating a closed band and a fastener of a screen according to another embodiment of the present disclosure.

BEST MODE

Hereinafter, exemplary embodiments disclosed herein will be described in detail with reference to the accompanying drawings. The same reference numbers will be used throughout the drawings to refer to the same or like parts, and redundant description thereof will be omitted. As used herein, the suffixes "module" and "unit" are added or used interchangeably to facilitate preparation of this specification and are not intended to suggest distinct meanings or functions. In the following description of the embodiments of the present disclosure, a detailed description of known technology will be omitted to avoid obscuring the subject matter of the present disclosure. The accompanying drawings are intended to facilitate understanding of the embodiments disclosed herein, and should not be construed as limiting the technical idea disclosed in the present specification. The disclosure is to cover all modifications, equivalents, and alternatives falling within the spirit and scope of the embodiments.

Terms including ordinal numbers such as first, second, etc. may be used to explain various elements. However, it will be appreciated that the elements are not limited to such terms. These terms are merely used to distinguish one element from another.

Stating that one constituent is "connected" or "linked" to another should be understood as meaning that the one constituent may be directly connected or linked to another constituent or another constituent may be interposed between the constituents. On the other hand, stating that one constituent is "directly connected" or "directly linked" to another should be understood as meaning that no other constituent is interposed between the constituents.

As used herein, the singular forms "a", "an", and "the" include plural referents unless context clearly dictates otherwise.

In this specification, terms such as "includes" or "has" are intended to indicate existence of characteristics, figures, steps, operations, constituents, components, or combinations thereof disclosed in the specification. The terms "includes" or "has" should be understood as not precluding possibility of existence or addition of one or more other characteristics, figures, steps, operations, constituents, components, or combinations thereof.

Figure 1:
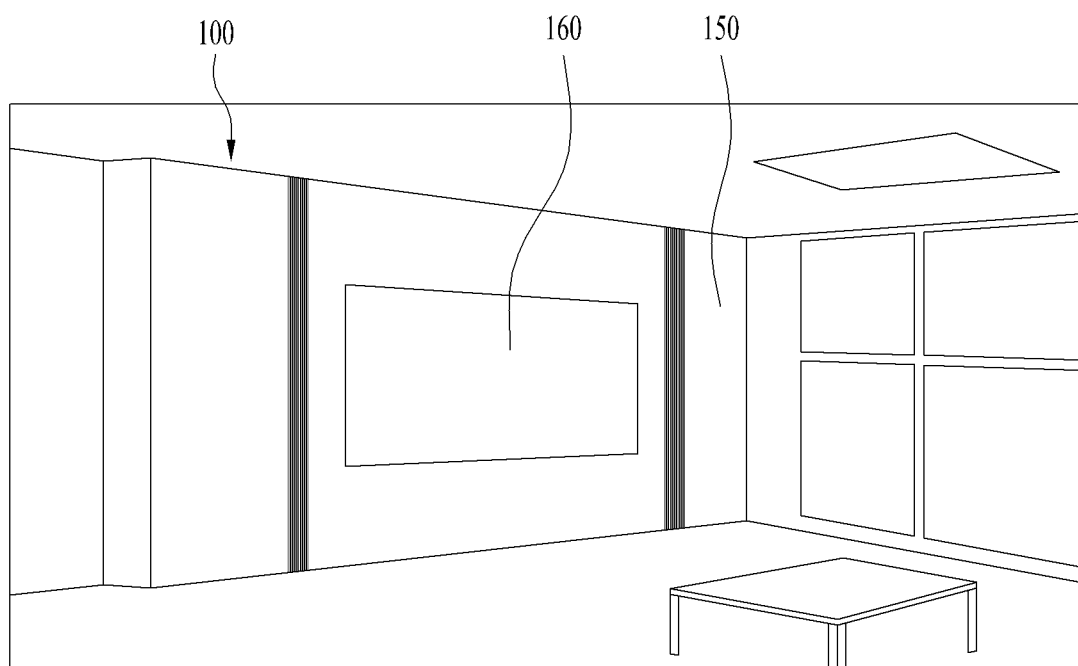
FIG. 1 is a view illustrating an installation example of a smart wall.

FIG. 1 is a view showing a wall-type frame of a media wall 100 of the present disclosure. The present disclosure relates to a media wall 100 systemized by integrating electronic devices used at home, such as media devices and home appliances, with a wall so as not to be exposed through the exterior of the media wall. The present disclosure provides a total space solution that minimizes the exposure of electronic devices in a space by mounting various electronic devices such as a display, an interphone, a loudspeaker, an air purifier, a humidifier, a light, a digital clock, a router, and a set-top box on a wall.

Recently, the thickness of a display device 161 has become thin. Thus, the media wall 100 of the present disclosure may be formed to have a the thickness of 15 to 20 cm, thereby preventing the interior space from being narrowed during installation. Rather, the storage furniture and a home appliance 160 may be embedded in the media wall 100 to provide a neat appearance. When necessary, a part of the wall may be selectively drawn out to allow a necessary home appliance to protrude from the wall, and the space where the home appliances are not embedded may be used as a mounting cell 114 for an item such as a drawer.

Recently, it has become possible to design a thin TV, and thus a thin display is implementable. Accordingly, the TV itself may serve as a cover of a frame and may be coupled to the frame to define a front appearance. An opening 153 may be formed in an art wall 151 to expose the display of the display device 161. A cover to open and close the opening 153 may be further provided.

A display employing organic light-emitting diodes (OLED) is bendable, and therefore it may be exposed to the outside only when used and may be rolled up and kept inside the wall when not in use, thereby providing a tidy screen by appearance.

Regarding projectors, a unifocal projector has recently been developed. This projector may be mounted on the wall and drawn out like a drawer to output images on a screen, thereby implementing a large screen. In this case, when the projector is in use, the display is unseeable from the outside of the media wall 100, and therefore may provide a tidier appearance.

Figure 2:
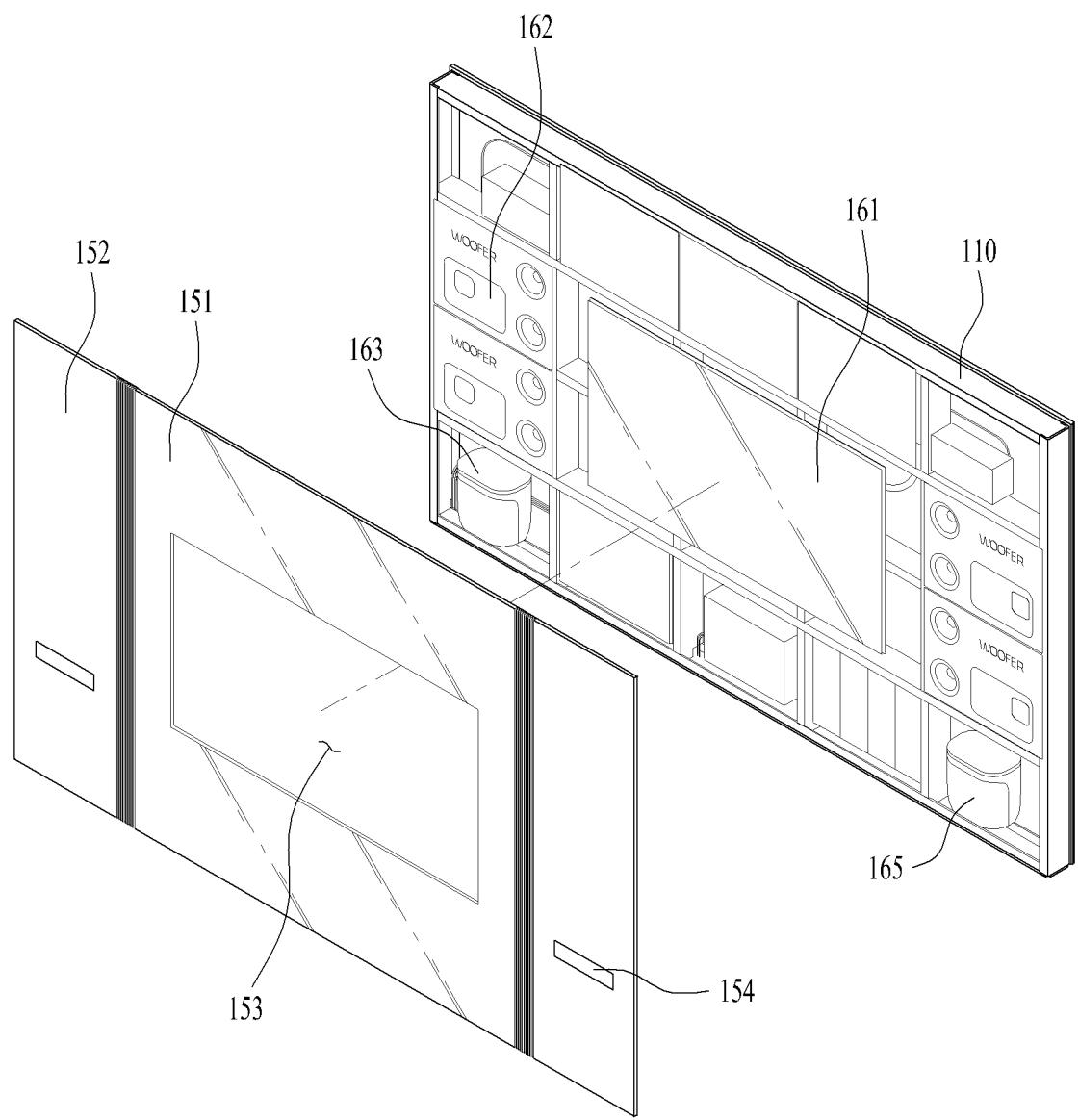
FIG. 2 is an exploded perspective view of a smart wall according to an embodiment.
Figure 3:
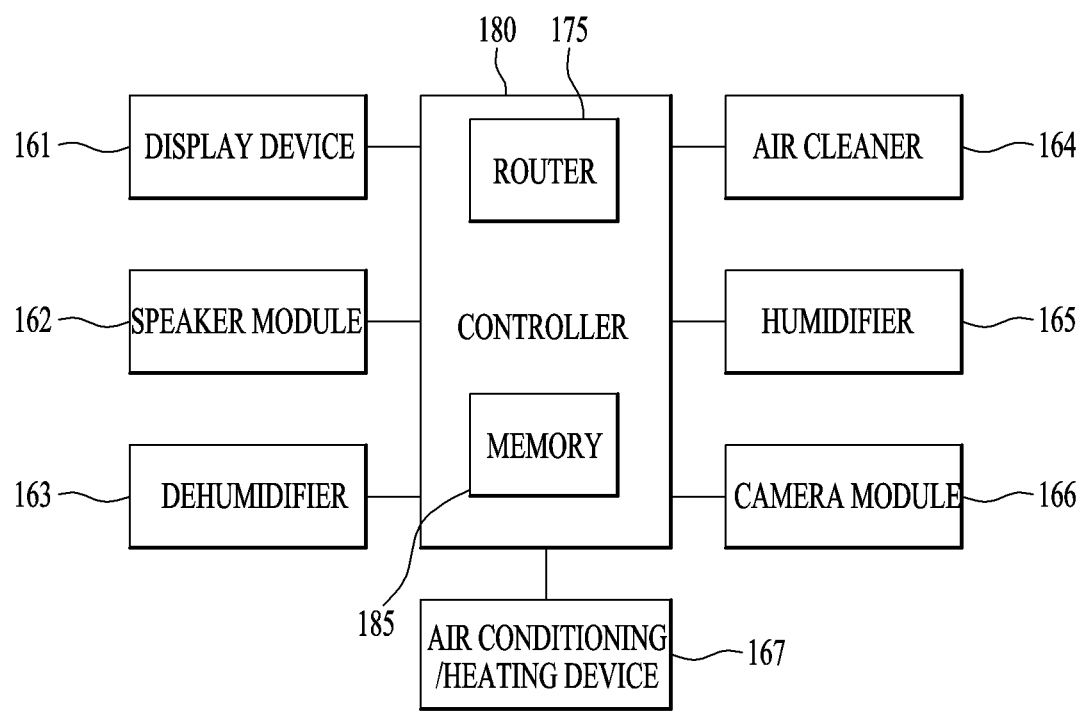
FIG. 3 is a block diagram of the smart wall according to an embodiment.

FIG. 2 is an exploded view of the media wall 100 of the present disclosure, and FIG. 3 is a block diagram of the media wall 100 according to the present disclosure. A frame structure formed by a plurality of pieces of shape steel arranged in a grid form may be disposed inside the art wall 150, which is on the front. The frame structure 110 is a rigid member. The frame structure 110 may support the wall so as not to collapse even when an impact is applied to the wall. A panel may be attached to the front of the frame structure 110 to hide the electronic appliance 160 mounted on the frame structure 110, thereby looking like a wall. The front wall covered with such a panel is called an art wall 150.

The art wall 150 may be changed according to the preference of the consumer. The art wall 150 may be easily changed after being installed to change the mood of the home.

The shape steel 115 arranged in a grid form may partition the mounting cell 114, and seat the electronic appliance 160 in each of the partitioned mounting cells 114. The partitioned mounting cells 114 may have the same size or sizes which are multiples of a size. Thus, the electronic appliance 160 to be mounted may be modularized and disposed at any position in the frame structure 110.

In addition to the display device 161 described above, a sound device 162 such as a loudspeaker may be mounted in the mounting cell 114. Multiple sound devices 162 may be configured according to the number of channels. The art wall 152 covering the sound device 162 may be configured in a mesh form to allow sound to be output, or may selectively open and close the openings through which the sound is output, such that the openings exposed to the art wall 152 are minimized. A waterproof mesh or the like may be used to prevent water from being introduced through the openings.

A dehumidifier 163, a humidifier 165, an air cleaner 164, and an air conditioning/heating device 167, such as an air conditioner or a stove, which are seasonal household appliances, may be provided. Leaving the seasonal appliances exposed to the outside when not in use may cause dust to accumulate on the appliances and undermine the appearance. Thus, the seasonal appliances are usually kept in a storage area with a cover put thereon when they are not in use. When such appliances are embedded in the media wall 100 as in the present disclosure, they may be covered with the art wall 150 so as not to be exposed to the outside in a period for which the appliances are not used. In other words, the need for a separate storage space may be eliminated.

The dehumidifier 163 or the humidifier 165 may implement a drawer type space for collecting/storing water to remove collected water or supply water. Openings 154 through which air passes are needed to discharge water or to collect moisture in the surroundings.

The openings 154 may not be necessarily formed in the art wall 150, but a gap between the art wall 150 and the frame structure 110 may be used.

The air cleaner 164 may include an openable cover configured to periodically replace a filter.

Each electronic product may be individually controlled, but the media wall may further include a controller 180 configured to integrally control the electronic appliances mounted on the media wall. The controller may have a memory 185 and thus may store collected data therein.

The dehumidifier, the humidifier, and the air cleaner 164 may be installed at a lower end of the media wall 100 to allow a user to easily manipulate the dehumidifier, the humidifier, and the air cleaner. In addition, when a set-top box or a Wi-Fi router 175 is provided, a home network system may be implemented. Not only functional units mounted on the media wall 100 but also other electronic devices such as a computer or a mobile terminal located outside the media wall 100 may be connected via the Wi-Fi router 175 for interworking. The media wall may further include a controller 180 configured to control each electronic appliance 160.

An LED or a small display panel may be arranged on an upper portion of the media wall 100 to provide a user with simple information such as weather, time, event information, or may be used as lighting. A light may be provided to the media wall 100 to obtain an interior effect.

When different communication schemes or signals are used between the devices, the router 175 serves as an intermediate device to coordinate the schemes or signals and guide a path. In addition, a functional unit mounted on the media wall 100 may be connected and controlled via the WIFI router 175, rather than being connected by wire.

The router 175 also serves to connect an external network and the internal network to each other. Accordingly, the user staying outside may control, via the router 175 connected to the external network, not only the electronic appliance 160 mounted on the media wall 100 but also other home appliances and media devices connected to the home network.

In addition, the controller 180 may control the electronic devices of the media wall 100 in operative connection with a mobile device. That is, when the mobile device is mounted on the media wall 100, media images and music on the mobile device may be output. In addition, when a video call is received through the mobile device, the controller may receive information from the mobile device by Bluetooth or Wi-Fi and output the image of the other party through the display device 161 of the media wall 100.

In addition, a wall pad connected to a camera or security system of the front door may be provided in the mounting cell 114 of the media wall 100. The wall pad embedded in the existing bearing wall is difficult to repair and replace in case of failure, and there is a difficulty in changing the location thereof. However, when the wall pad is configured in a unit form and provided in the media wall 100, maintenance thereof is easy.

The media wall 100 may be installed in a room as well as the living room. The wall between the rooms may be configured as the media wall 100 to use the media wall 100 in both directions in neighboring rooms. For example, one air conditioner or air purifier may be used in both spaces when it is arranged to be reachable in both directions. Instead of the TV and loudspeaker 162 used in the living room, a monitor and a personal computer (PC) may be mounted and used based on the purpose of the room. Alternatively, another functional unit such as an electronic board may be mounted and used according to the age of a child.

When installed in an office, a media wall 100 equipped with functional units such as an electronic board, an air purifier, a video conference system, and a PC may be used. The electronic appliance 160 mounted on the media wall 100 is covered by the art wall 150 and thus do not require a separate exterior case.

When the media wall 100 is installed after being manufactured at a factory according to a user's installation location, large quantities of the same module may be manufactured and supplied to a hotel/resort or apartment under construction, thereby reducing defect rate and manufacturing costs.

However, it is difficult to transport the media wall 100 that has been assembled. Further, when construction of a building is completed, it is difficult to bring the media wall 100 into the building. Accordingly, when the media wall 100 is installed at the time of movement into an existing building or remodeling of the interior, the media wall 100 may be implemented by installing a frame in the building and inserting a unit module. In this case, for ease of installation and standardization, the frame structure 110 may be implemented using a plurality of module frames.

Figure 4:
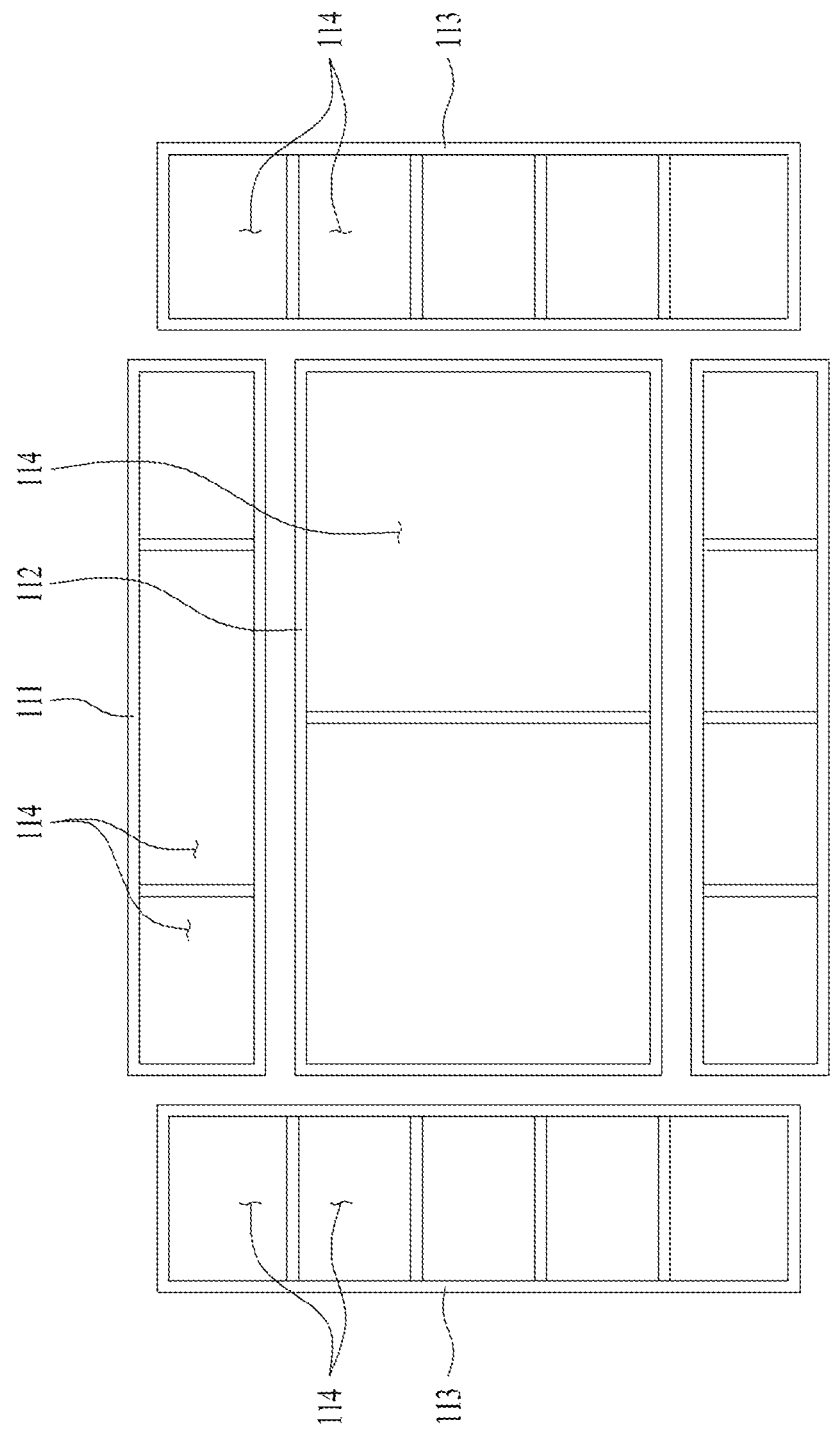
FIG. 4 is a view illustrating a configuration of frames of the smart wall according to an embodiment.

FIG. 4 is a view illustrating coupling of frame modules 111, 112, and 113 of the media wall 100 according to an embodiment of the present disclosure. In order to mount each component, bookcase-type frame modules 111, 112, and 113 including the mounting cell 114 may be used. In order to partition the mounting cell 114, the frame modules 111, 112, and 113 may be manufactured by arranging a plurality of pieces of beam-shaped shape steel 115 in a grid.

The frame modules 111, 112, and 113 may include a first frame module 111 having mounting cells 114 arranged side by side in a horizontal direction, a second frame module 112 provided to mount a large appliance 160 such as the display device 161, a third frame module 113 having mounting cells 114 arranged side by side in a vertical direction.

The second frame module 112 includes a large space to allow the display device 161 of any size to be mounted therein. When necessary, as shown in FIG. 4, beams to partition the mounting cell 114 may be provided to fix the display device 161 and to enhance rigidity of the frame structure 110.

The first frame module 111 and the second frame module 112 may be stacked in a vertical direction. The horizontal length of the first frame module 111 may be the same as the horizontal length of the second frame module 112. Thus, when the modules are stacked in the vertical direction, they may be disposed so as not to be misaligned.

The first frame module 111 may be disposed both over and under the second frame module 112. The number of first frame modules 111 stacked in the vertical direction may be increased or decreased depending on the sizes of the first frame module 111 and the second frame module 112 or the size of the installation space.

The third frame module 113, in which the mounting cells 114 are arranged side by side in the vertical direction, may have the same height as that of the first frame module 111 and the second frame module 112 stacked in the vertical direction. As shown in FIG. 4, the third frame module 113 may be located on the lateral sides of the first frame module 111 and the second frame module 112. The frame modules 111, 112, and 113 may be coupled with fasteners to form the frame structure 110 having a rectangular parallelepiped shape.

Figure 5:
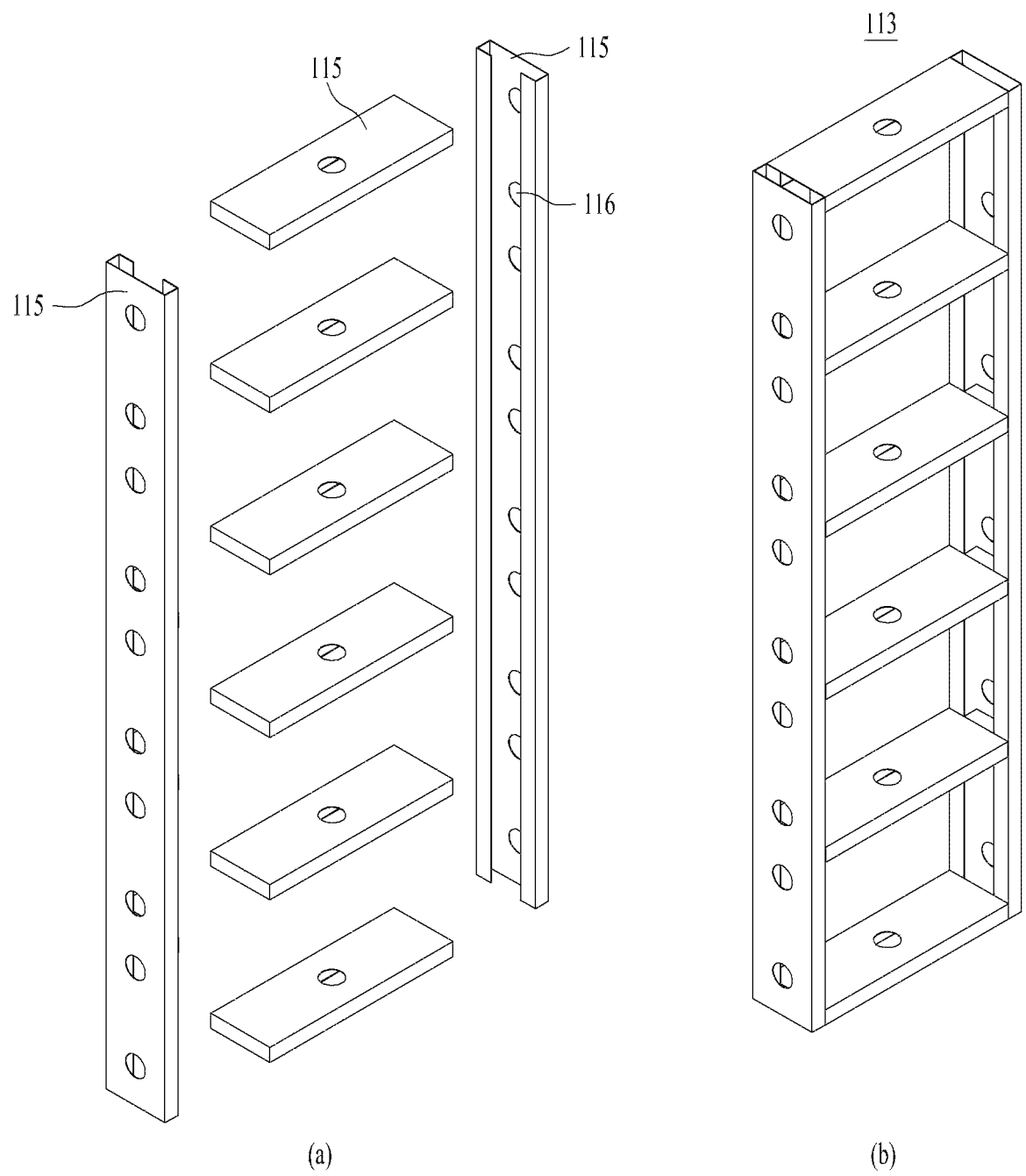
FIG. 5 shows examples of various frame structures according to a combination of frame modules.

FIG. 5 is a view illustrating a method of manufacturing the frame modules 111, 112, and 113 of the present disclosure. The third frame module 113 in which the mounting cells 114 are arranged in the vertical direction will be described as an example. Each of the frame modules 111, 112, and 113 may be formed using the shape steel 115 extending in one direction. The shape steel is a structural member and represents all rod-shaped members having various cross-sectional shapes. Rod-shaped steel having the same cross section in the longitudinal direction may be formed by rolling or by bending a sheet material. The shape steel has a hollow space compared to a beam-shaped member having a circular or rectangular cross section. Thus, it is a lightweight member obtaining rigidity greater than or equal to a predetermined value with a little amount of material.

As shown in FIG. 5, the present disclosure may employ C-shape steel 115 having a C-shaped cross section. The C-shape steel 115 may be formed by vertically bending both width ends of a metal plate. When both ends of the metal plate are vertically bent only once, the plate may have a square bracket-shaped cross section. When both ends of the metal plate are vertically bent twice, the plate may have a C-shaped cross section. A power line or signal line connected to the electronic appliance 160 may be disposed in the internal space of the steel, and an outlet module 140 to which a power cable or a data cable is fastened may be disposed.

The outlet module 140 may include a power terminal for supplying power, a data terminal for data transmission and reception such as an Internet line or a cable input, and a connector by which a functional unit inserted into the frame is connected to another functional unit. The connector has terminals on both sides of the frame. When data connection lines of electronic devices are inserted into the terminals, the devices may exchange data with each other. The outlet module 140 may include a rail structure that moves along the frame modules 111, 112, and 113.

A vent hole 116 may be formed in the shape steel 115 as shown in FIG. 5. The vent hole 116 may reduce the weight of the shape steel 115 and discharge heat generated from the electronic appliance 160. A fan may also be used to discharge hot air to the outside to more actively discharge heat. When the heat of the electronic appliance 160 is discharged into an indoor space, a heating effect may be obtained in winter. However, in summer, discharging the heat into the indoor space may cause the indoor temperature to rise. Thus, the fan may be used to internally circulate heat, or a structure to discharge heat to the outside may be added to the wiring connected to the outdoor unit of the air conditioner.

Each of the frame modules 111, 112, and 113 may include outer steel defining a rectangular outer periphery and inner steel arranged therein to partition the mounting cell 114. The outer steel may include vertical steel extending in the vertical direction and horizontal steel extending in the horizontal direction. The first frame module 111 to the third frame module 113 may be assembled by arranging the horizontal steel between a pair of vertical steels. In order to fasten the vertical steel with a fixing member 120, which is fixed to the ceiling and the floor, the upper and lower ends of the vertical steel may need to be exposed. Therefore, the vertical steel may be arranged outside the horizontal steel may be fastened by inserting vertical brackets 122 and 123 of the fixing member 120 to the end of the vertical steel.

The inner steel positioned inside the outer steel may define the mounting cell 114 by partitioning a space surrounded by the outer steel. The inner steel may be immovably connected to the outer steel by welding, and part of the inner steel may be bolted or hooked so as to be removed when necessary.

Thus, by fascinating the frame modules 111, 112, and 113 in the form of a semi-finished appliance 160 in the above-described manner, the number of connection operations to be performed on the site may be reduced. The dimensions of the appliance 160 may be kept constant and the installation time may be reduced. In addition, the product may be modularized into a size that facilitates movement of the product, and therefore may be easily moved to the site.

FIG. 6 shows examples of various frame structures 110 according to a combination of the frame modules 111, 112, 113 of the present disclosure. FIG. 6(a) illustrates assembly of a frame structure 110 consisting of a pair of first frame modules 111a of FIG. 4, one second frame module 112a, and a pair of third frame modules 113. Since the first frame module 111a has four mounting cells 114, the width of the first frame module 111a may not fit to a narrow indoor space for installation.

Accordingly, as shown in FIG. 6(b), a first frame module 111b having three mounting cells 114 to have a short horizontal length may be used. The second frame module 112b may have a length corresponding to the horizontal length of the first frame module 1/1b.

In addition, the third frame modules 113 may be disposed on both sides of the vertical stack of the first frame module 111 and the second frame module 112. The ceiling height of a typical house is 220 cm to 230 cm, the third frame module 113 may be configured to have a height a little less than 220 cm. While a five-stage vertical frame is illustrated in the drawings, a six-stage vertical frame may be manufactured in case of a multilayer house or a house having a great ceiling height.

When installed in a narrower space, the frame structure 110 may be configured using only the first frame module 111a and the second frame module 112a without the third frame module 113. When a large display device 161 is not mounted, only the third frame modules may be arranged in a line to implement the frame structure 110. Each frame module 111, 112, 113 may be fastened by bolts, or may be fastened by welding.

Figure 7:
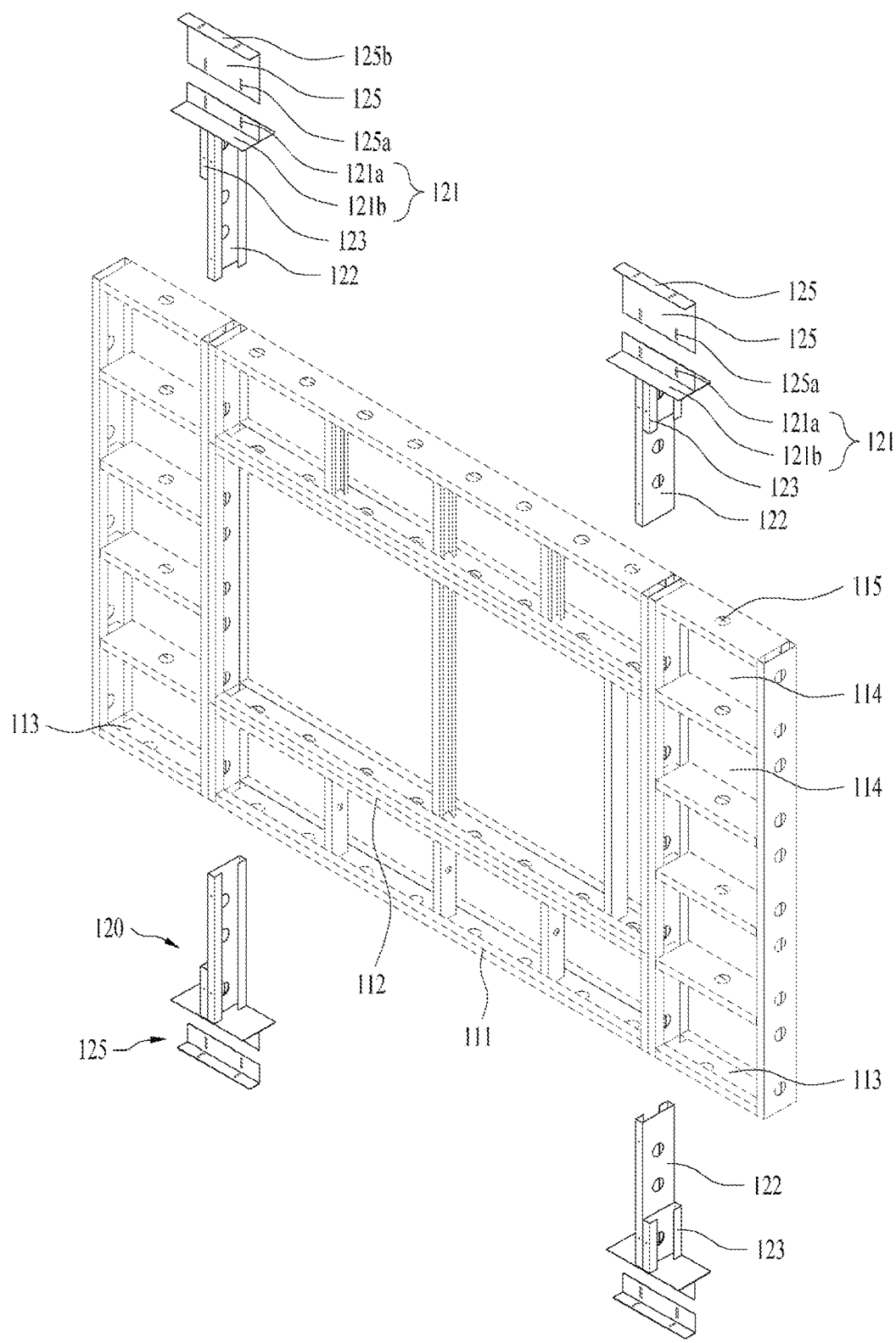
FIG. 7 is a view illustrating a method of installing a frame structure of the smart wall according to an embodiment.

FIG. 7 is a view illustrating a method of installing a frame structure 110 of the media wall 100 according to an embodiment of the present disclosure. The frame structure 110 formed by fastening the frame modules 111, 112, and 113 may be fixed to the ceiling and the floor so as to be installed in an indoor space.

The fixing bracket 125, which is installed on the ceiling or the floor, is a member bent in an L shape. One side 125b of the fixing bracket 125 is disposed on the ceiling or the floor, and the opposite side 125a thereof vertically extends from the ceiling or the floor. The frame structure may include a first vertical bracket 122 inserted into an internal space of the vertical steel thereof.

The first vertical bracket 122 may be formed to be longer than the vertical length of the first frame module 111 to fasten not only the first frame module 111 but also the second frame module 112. The frame structure may further include a second vertical bracket 123 disposed in parallel with the first vertical bracket 122 and inserted into the third frame module 113. Since the vertical steel of the third frame module 113 is one member, the vertical steel does not need to be as long as the first vertical bracket 122.

A coupling bracket 121 may be coupled to an end of each of the first vertical bracket 122 and the second vertical bracket 123 to form a T-shape together with the vertical brackets 122 and 123. The coupling bracket 121 may include a seating portion 121b coupled to the vertical brackets 122 and 123 and seated on the top surfaces of the first frame module 111 and the third frame module 113, and a fastening portion 121a vertically extending from the seating portion 121b and fastened to the fixing bracket 125. The coupling bracket 121 and the fixing bracket 125 may be fastened to each other using a screw, and may each have a fastening hole, which the screw is fastened. The fastening hole may be vertically elongated such that the brackets may be adjusted according to the ceiling height.

When the media wall 100 is installed on the existing wall, a fixing member 120 may be further provided to fasten the media wall to the existing wall.

A sound device such as the loudspeaker 162 is positioned on the media wall 100. Accordingly, when the media wall 100 is used as a temporary wall, spaces separated by the wall are formed. In this case, the media wall 100 may be fixed by adding a soundproof structure to prevent sound from leak to the two spaces through the ceiling, the floor, and the sidewalls which are in contact with the media wall 100.

Figure 8:
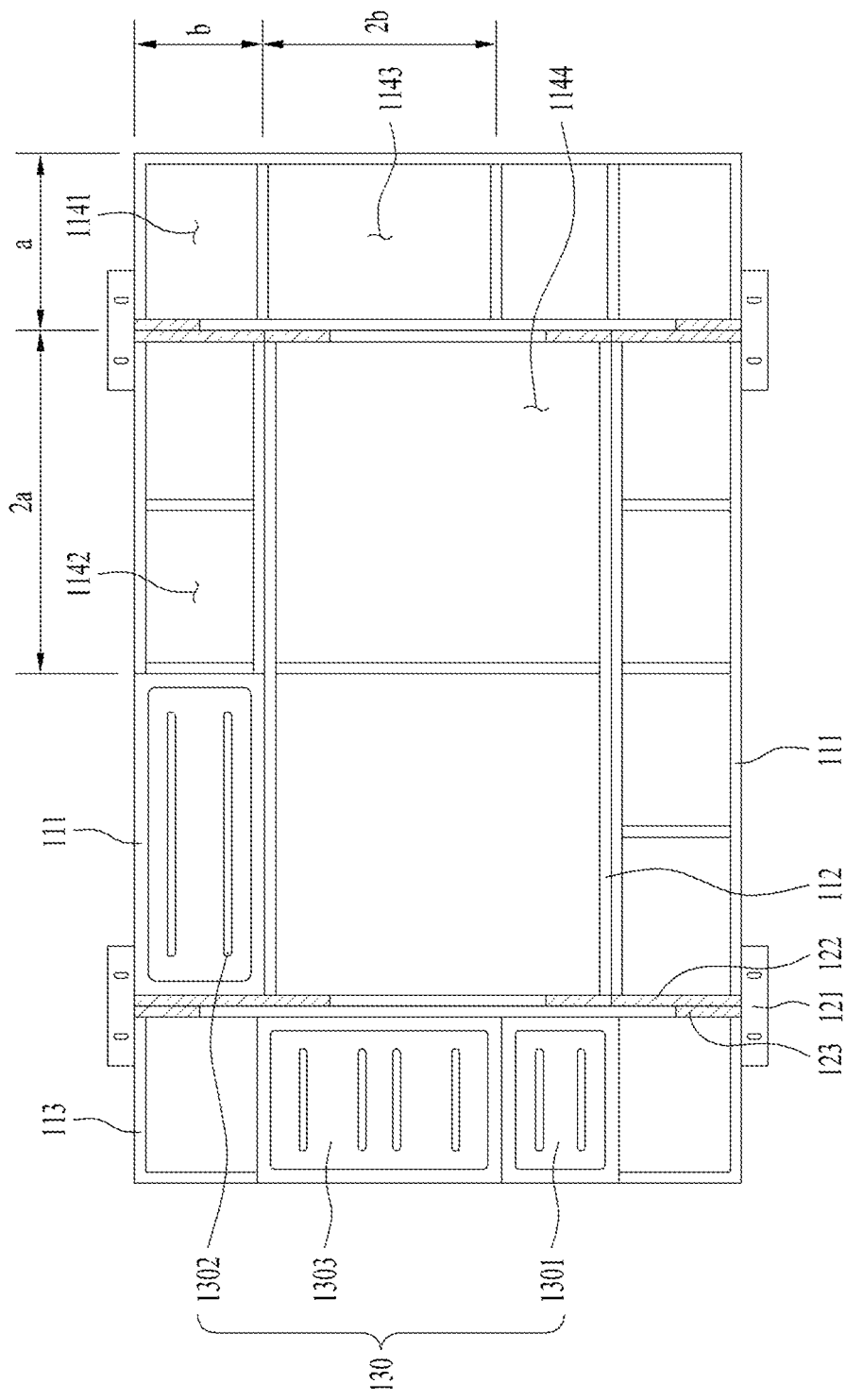
FIG. 8 is a view illustrating a basket of the smart wall according to an embodiment.

FIG. 8 is a view illustrating a basket 130 of the media wall 100 according to an embodiment of the present disclosure. The frame modules 111, 112, and 113 may be divided into a plurality of mounting cells 114 using the inner shape steel 115. As shown in FIG. 7, the basket 130 may be inserted into the mounting cells 114 to provide a space in which the electronic appliance 160 is seated. The second frame module 112 has a relatively large mounting cell 114 because the display device 161 is located therein. On the other hand, the mounting cells 114 of the first frame module 111 and the third frame module 113 may be formed to have standardized sizes. Using the mounting cells 114 of the standardized sizes, the basket 130 may also be standardized. Accordingly, there is no need to manufacture various different shapes of parts.

However, forming the mounting cells to have the same size may be favorable to standardization, but a larger cell may be needed depending on the electronic appliance 160 to be mounted. For example, since the size of the air conditioner is different from that of the air cleaner, the mounting cell 114 may be formed to have a size which is an integer multiple of a base size in consideration of the difference in size. For example, based on a first mounting cell 1141 having a horizontal dimension equal to a and a vertical dimension equal to b, a second mounting cell 1142 having a horizontal dimension equal to an integer multiple of a or a third mounting cell 1143 having a vertical dimension equal to an integer multiple of b may be provided.

The horizontal dimension of the first mounting cell 1141 corresponds to the horizontal dimension of the third frame module 113, and the vertical dimension thereof corresponds to the vertical dimension of the first frame module 111. Here, the mounting cell 114 refers to an internal space partitioned by the shape steel 115, and thus the difference in size between the first frame module 111 and the third frame module 113 caused by the thickness of the shape steel 115 is ignored.

Since the first frame module 111 has a short vertical length, the first frame module 111 may include only the first mounting cell 1141 and the second mounting cell 1142. Since the third frame module 113 has a short horizontal length, the third frame module 113 may include only the first mounting cell 1141 and the third mounting cell 1143.

Figure 10:
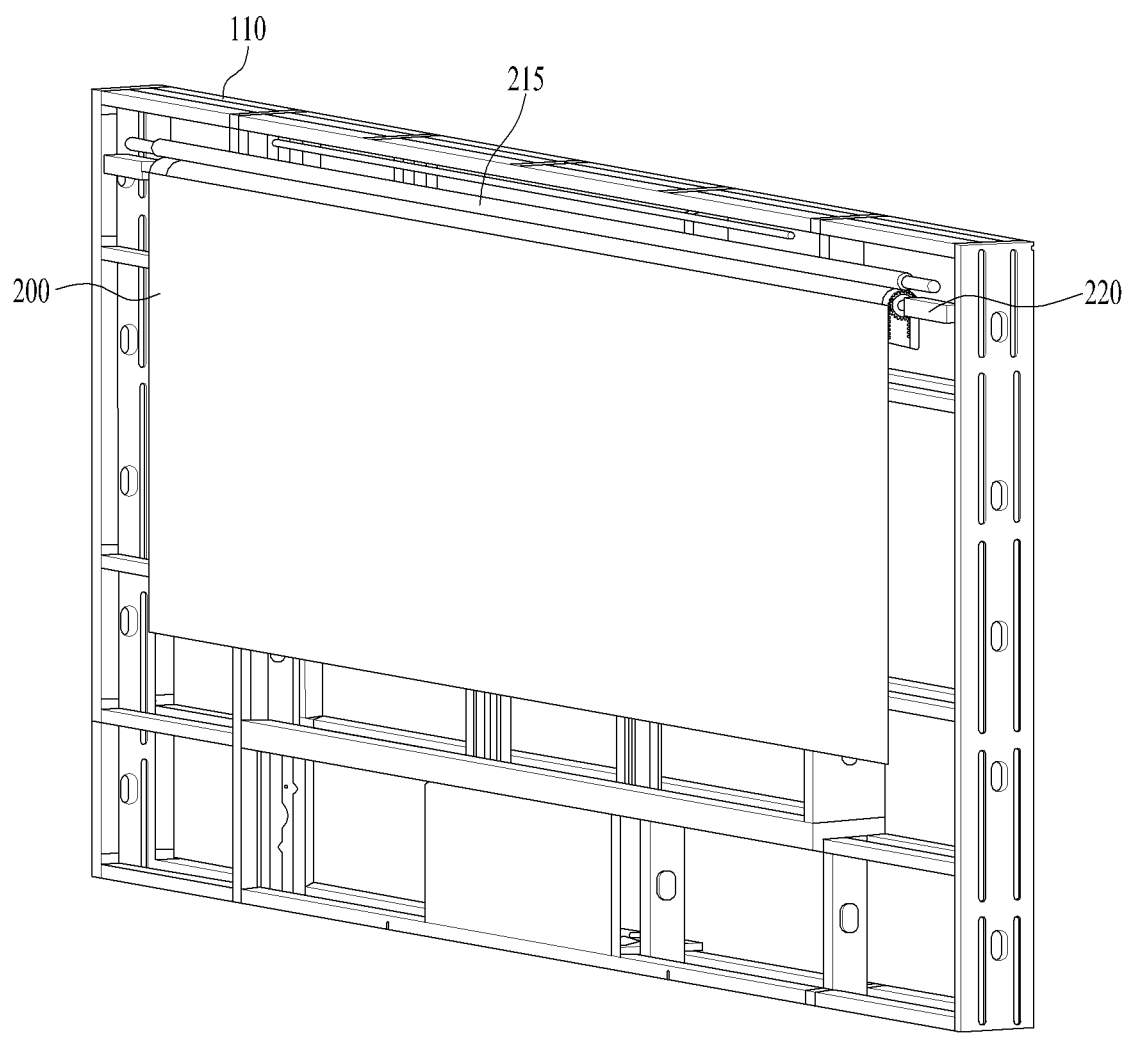
FIG. 10 is a view illustrating a screen disposed on a frame structure of a smart wall according to an embodiment of the present disclosure.

FIG. 9 is a view illustrating a change in a region where the display device 161 is exposed on the front surface of the smart wall 100 according to an embodiment of the present disclosure, and FIG. 10 is a view illustrating a screen 200 disposed on the frame structure 110 of the smart wall 100 according to an embodiment of the present disclosure. The frame structure 110 may include a plurality of mounting cells defined therein. The frame structure 110 may include the plurality of mounting cells, and the display device may be mounted in the mounting cell of the third frame module among the plurality of mounting cells. When watching a movie or broadcasting using the display device 161, the entire display device 161 should be exposed, but when the display device 161 is not in use, the screen 200 for covering the display device 161 may be included. A continuous wall surface may be created using the screen 200 similar to the art wall 150.

When necessary, only half of the display device 161 may be exposed to provide necessary information to a user as shown in (a) in FIG. 9, and the display device 161 may be exposed in a small size at ordinary times to obtain an interior effect as shown in (b) in FIG. 9.

The smart wall 100 of the present disclosure may include the screen 200 that selectively covers a front surface of the display device 161 to selectively expose the display device 161 as described above. The screen 200 may use a flexible material such as a fabric material. The screen 200 covers the front surface of the display device 161 and serves to cover the display device 161 so as not to be exposed to the outside when the display device 161 is not used.

The screen 200 may be wound half a turn around the driving roller 210, so that a portion (a first region) of the screen 200 may be located on the front surface of the display device 161, and a portion (a second region) of the screen 200 may be located on a rear surface of the display device 161. When an area of the second region of the screen 200 located on the rear surface of the display device 161 is increased, an area of the first region of the screen 200 located on the front surface of the display device 161 is reduced, so that a region exposed through the front surface of the display device 161 may be adjusted by adjusting the areas of the portions of the screen 200 located on the front and rear surfaces.

As shown in (a) in FIG. 9, the area of the first region may be increased to cover the display device 161, so that the structure exposed through the front surface may be minimized. In addition, when the area of the first region is reduced and the area of the second region is increased as shown in (b) in FIG. 9 or FIG. 1, the display device 161 is exposed through the front surface. When the display device 161 is exposed as the area of the first region is reduced, because the second region is disposed on the rear surface of the display device, the second region is not exposed to the user.

The controller 180 may adjust a rotation direction of the driving roller 210 to adjust an area of a portion of the screen 200 located on the front surface of the display device 161, and may sense a position of the screen 200 to control an output position and an output area of an image of the display device 161. In addition, the controller 180 may stop rotation of the driving roller 210 when the screen reaches a preset position using a sensor such that the screen stops at a desired position.

A motor 220 that rotates the driving roller 210 may be included, and the driving roller 210 may rotate by transmitting power of the motor 220 to the driving roller or applying a force to the screen 200 itself. A driver of the present disclosure provides a structure that may adjust the area of the portion of the screen 100 positioned in front of the display device 161 by transmitting a rotational force of the motor 220 to the driving roller 210 to stably move the screen 100 upwards and downwards.

FIG. 11 is a view showing a driver according to an embodiment of the present disclosure. (a) in FIG. 11 is an enlarged view of the driver including the driving roller 210, the motor 220, and the like, and (b) in FIG. 11 is an exploded perspective view illustrating the driving roller 210, a timing belt 222, a timing gear 221, and an auxiliary roller 325.

The driver of the present disclosure includes the motor 220, the timing gear 221, and the timing belt 222. The motor 220 is a device that provides the rotational force, and the controller 180 controls the motor 220 to adjust the areas of the first region and the second region. The timing gear 221, which rotates by receiving the rotational force of the motor 220, has a plurality of first teeth formed along an outer circumference thereof. The timing belt 222 on which second teeth meshing with the first teeth of the timing gear 221 are formed is a band-shaped member, and is coupled to a first surface of the screen 200 as shown in (b) in FIG. 11. Because a second surface opposite to the first surface is exposed to the outside and the first surface is not exposed to the user, even when the timing belt 222 is coupled to the first surface, an appearance of the screen 200 is not affected.

The timing belt 222 may contain a ductile material, such as silicone, to be wound along the timing gear 221. When the timing belt 222 moves along with the rotation of the timing gear 221, the screen 200 may also move together. A force may be transmitted to an entire area of the screen 200, so that the screen 200 may move stably.

The timing gear 221 may be connected to the driving roller 210, so that the timing gear 221 and the driving roller 210 may rotate together as a rotation axis of the timing gear 221 and a rotation axis of the driving roller 210 coincide with each other. The rotational force of the driving roller 210 is directly transmitted to the screen 200 because the driving roller 210 itself rotates rather than rotates by the movement of the screen. That is, the screen may receive the rotational force of the motor 220 through the timing belt 222 as well as through the driving roller 210.

A surface of the driving roller 210 may be coated with a material with high friction such that the rotational force of the driving roller 210 is transmitted to the screen 200. For example, a silicone or rubber material may be coated on the surface of the driving roller 210. A coated portion of the driving roller 210 may have a thickness corresponding to thicknesses of the timing gear 221 and the timing belt 222 such that the screen 200 is not wrinkled.

The auxiliary roller 325 disposed side by side with the driving roller 210 may be further included to prevent the screen 200 from wrinkling and allow the screen 200 to move along with the rotation of the driving roller 210 without being pushed.

The auxiliary roller 325 extends in a direction parallel to the driving roller 210, and the screen 200 passes through a space between the auxiliary roller 325 and the driving roller 210. The auxiliary roller 325 may rotate in a direction opposite to the rotation direction of the driving roller 210 to move the screen 200, and include a coated portion made of the elastic material like the driving roller 210 for a frictional force with the screen 200. The auxiliary roller 325 holds the screen 200 to be in close contact with the driving roller 210, so that the screen 200 may move in close contact with the driving roller 210 without being lifted or sliding.

In order to match a rotation period of the auxiliary roller 325 with a rotation period of the driving roller 210, a rotational force may be provided to the auxiliary roller 215 by further including a first spur gear rotating together with the driving roller 210 and a second spur gear coupled to the auxiliary roller 325.

A pair of timing belts 222 may be located on both sides in the horizontal direction of the screen 200. The timing gears 221 may be coupled to both sides of the driving roller 210, so that one motor 220 may drive two timing gears 221.

Figure 12:
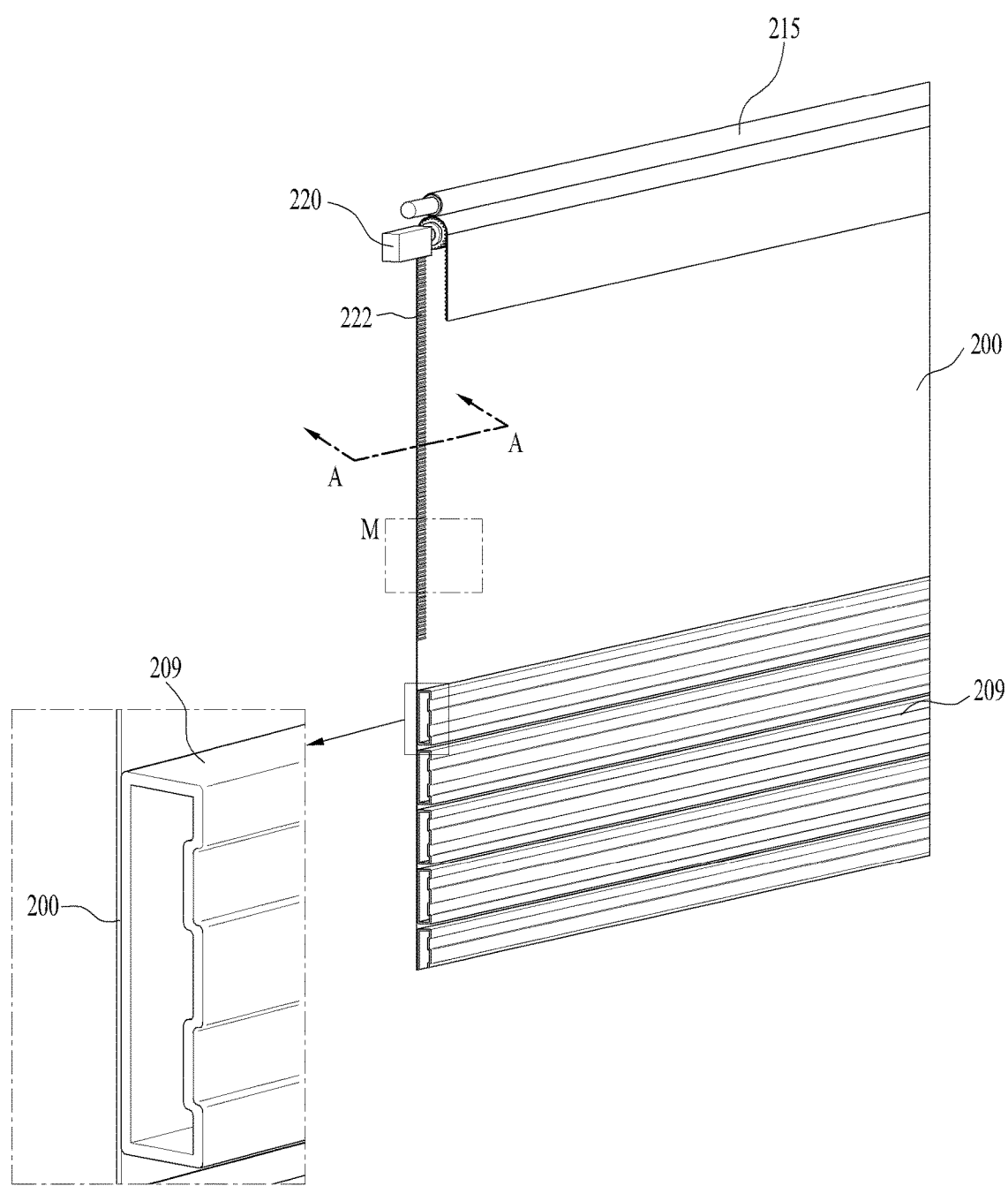
FIG. 12 is a rear view of a screen according to an embodiment of the present disclosure.

FIG. 12 is a view of the screen 200 of the smart wall according to an embodiment of the present disclosure viewed from the rear. The screen 200 may further include a load beam 209 extending in the horizontal direction at a first lower portion that is a lower portion of the first region positioned in front of the driving roller 210 such that the screen 200 may be kept flat without being lifted. The load beam 209 may pull the screen 200 downwards, so that the screen 200 may be flattened without a lower portion thereof being lifted. A plurality of load beams 209 may be disposed as needed to pull the screen 200 with an appropriate force.

Because the load beam 209 extends in the horizontal direction, bending in the horizontal direction may be minimized by the driving roller 210 at an upper portion and the load beam 209 at a lower portion. The load beam 209 may further reinforce horizontal rigidity by defining a groove extending in the horizontal direction as shown in FIG. 12 for the rigidity.

Because of not being able to be wound on the driving roller 210, the portion where the load beam 209 is located is always located on the front surface of the display device 161. Therefore, the timing belt 222, which guides the winding of the screen on the driving roller 210, is not located in the first lower portion where the load beam 209 is located, but only needs to be located in a portion above the first lower portion. The load beam 209 may also be disposed in the second region for balancing forces of the first region and the second region.

Figure 13:
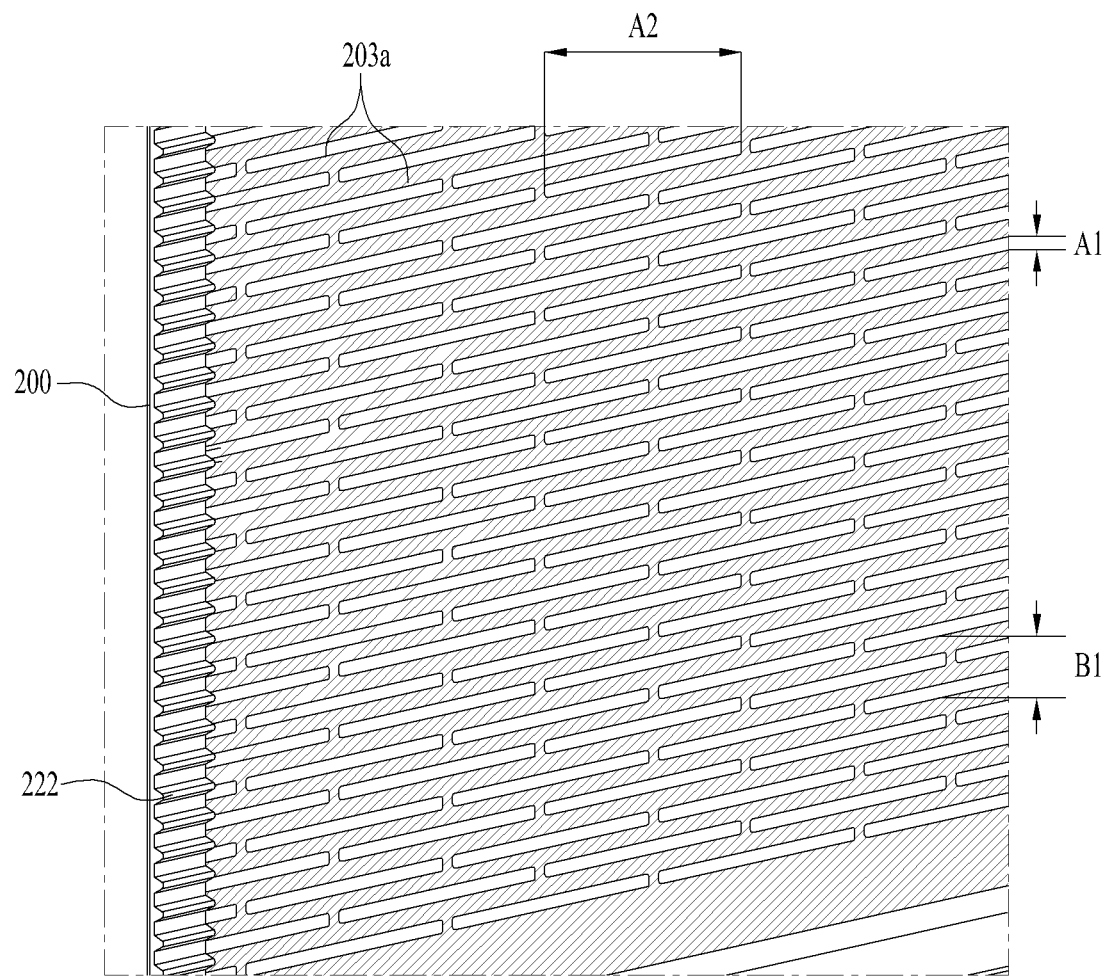
FIG. 13 is a view illustrating a structure of a mesh according to an embodiment of the present disclosure.

FIG. 13, which is a view illustrating a structure of a metal mesh 203 according to an embodiment of the present disclosure, is an enlarged view of a portion M of FIG. 12. The screen 200 of the present disclosure may include a first fabric 201 exposed to the user, and may include the metal mesh 203 directed to face a first surface of the first fabric 201. The metal mesh 203 contains a metal material such as stainless use steel (SUS), and includes a plurality of mesh holes 203a. The rigidity may vary depending on a size of the mesh holes.

The screen 200 of the present disclosure should be able to maintain the rigidity in the horizontal direction and be able to bend along the driving roller 210 in the vertical direction. That is, because there is a difference in required values of the rigidity in the horizontal direction and the ductility in the vertical direction, in order to satisfy such difference, as shown in FIG. 13, the mesh hole 203a extends longer in the horizontal direction than in the vertical direction (a1<a2). When the mesh hole 203a extends long in the horizontal direction, an area in the horizontal direction of a metal portion that is bent when the screen 200 is bent in the vertical direction is reduced. Therefore, the metal hole extending long in the horizontal direction is advantageous in the bending deformation in the vertical direction.

The plurality of mesh holes 203a of the present disclosure are arranged in the vertical direction and the horizontal direction, and the mesh holes 203a neighboring in the vertical direction are staggered. That is, start and end points of the mesh hole 203a are located at different lines from those of the mesh hole 203a neighboring in the vertical direction, so that a length b1 of the metal portion extending in the vertical direction may be small unlike a length of the metal portion extending in the horizontal direction.

In the present embodiment, the mesh holes 203a are arranged side by side in the horizontal direction and staggered in the vertical direction, so that the horizontal rigidity may be improved while maintaining the vertical ductility of the screen 200 as much as possible.

Figure 14:
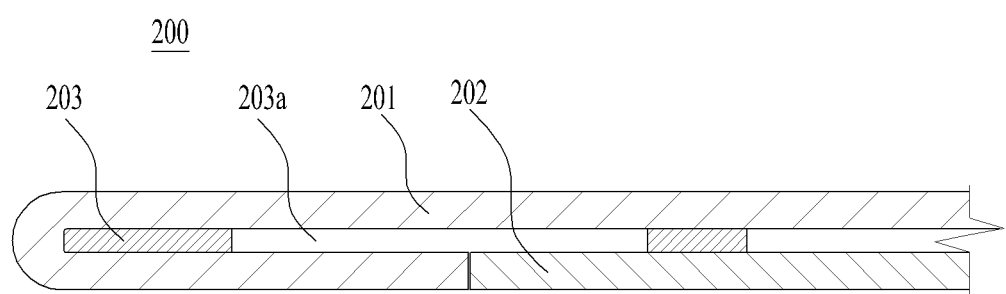
FIG. 14 is a cross-sectional view taken along a line A-A in FIG. 12.

FIG. 14 is a cross-sectional view taken along a line A-A in FIG. 12. In addition to the first fabric 201 positioned on a second surface of the metal mesh 203, a second fabric 202 positioned on the first surface of the metal mesh 203 may be further included. When the metal mesh 203 is exposed to the first surface, the metal mesh 203 may come into direct contact with a surface in contact with the driving roller 210, so that the driving roller 210 may be worn. In addition, there is a risk of injury when a user's hand touches the metal mesh 203. To prevent this, a first surface of the metal mesh 203 may be covered with the second fabric 202. FIG. 13 is a view omitting the second fabric 202 to show the metal mesh 203, but, as shown in FIG. 12, the metal mesh 203 is not exposed to the first surface of the screen 200 because the second fabric 202 covers the metal mesh 203.

When sizes of the first fabric 201, the second fabric 202 and the metal mesh 203 are the same, there is a problem in that the metal mesh 203 is exposed to an end of the screen 200. The first fabric 201 may be increased in size to surround an end of the metal mesh 203 as shown in FIG. 14 such that the stacked structure of the screen 200 is not exposed at an end of the screen 200. An end of the first fabric 201 may be directed to face the first surface of the metal mesh 203, and the second fabric 202 may be formed small by a size corresponding thereto, so that the first fabric 201 and the second fabric 202 do not overlap.

Figure 15:
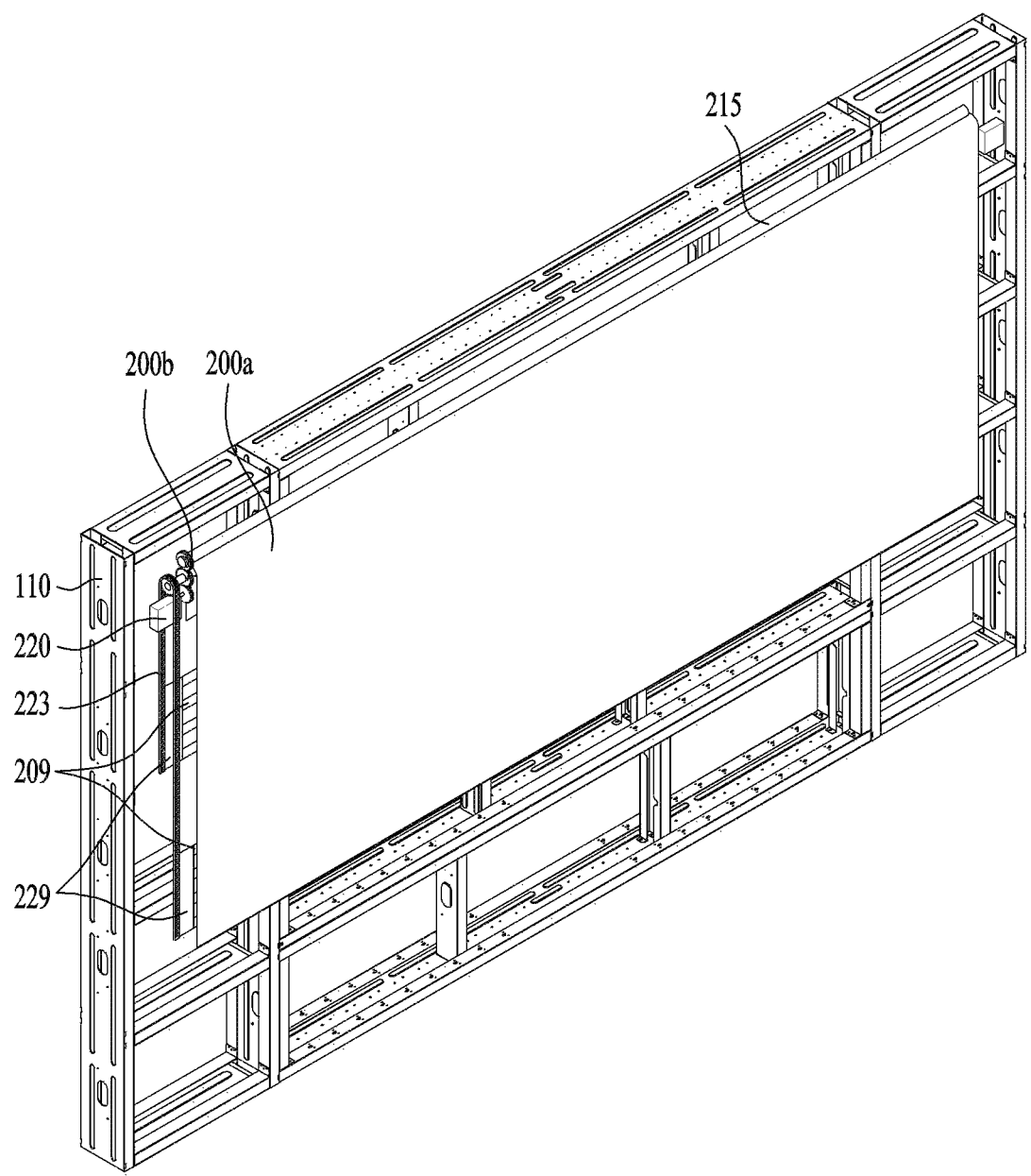
FIG. 15 is a view illustrating a screen disposed on a frame structure of a smart wall according to another embodiment of the present disclosure.
Figure 16:
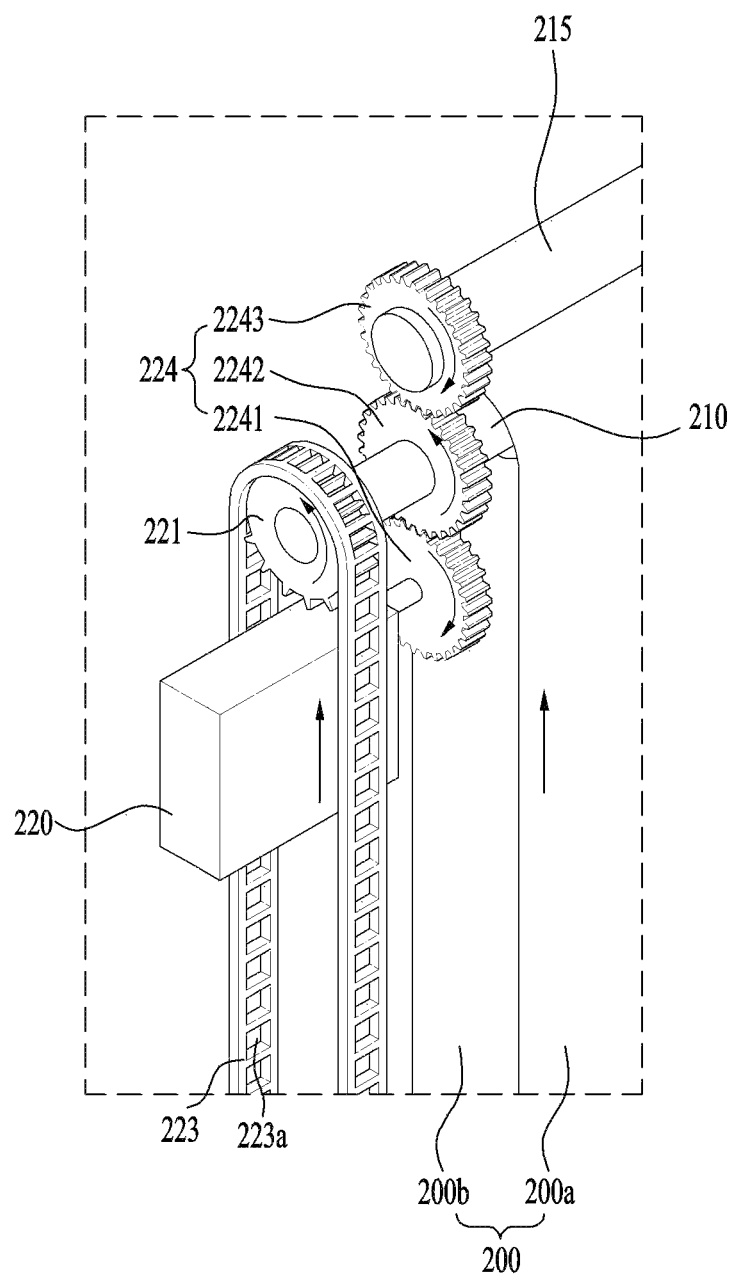
FIG. 16 is a view illustrating a driver of a smart wall according to another embodiment of the present disclosure.

FIG. 15 is a view illustrating the screen 200 disposed on the frame structure 110 of the smart wall 100 according to another embodiment of the present disclosure, and FIG. 16 is an enlarged view of the driver of the smart wall in FIG. 15.

The driver of the present disclosure includes the motor 220, the timing gear 221, and a timing chain 223. The motor 220 is a device that provides the rotational force, and the controller 180 may control the motor 220 to adjust the areas of the first region 200a and the second region 200b of the screen. The timing gear 221, which rotates by receiving the rotational force of the motor 220, has the plurality of first teeth formed along the outer circumference thereof. The timing chain 223 in which holes 223a engaged with the first teeth of the timing gear 221 is defined is a band-shaped member, is disposed adjacent to the screen 200 in a lateral direction as shown in FIG. 16. Because the timing chain 223 is located next to the screen 200, the timing chain 223 may be covered with the art wall so as not to be exposed to the user.

The timing chain 223 moves as the holes 223a into which the first teeth are respectively inserted move together when the timing gear 221 rotates. A portion of the timing chain 223 in contact with the timing gear 221 forms a curved surface, but remaining portions thereof form a straight line, so that the timing chain 223 may have shape with a variable curvature. The flexible timing chain 223 may be formed by connecting a plurality of unit chains respectively including the holes 223a, or the timing chain 223 may be implemented using a flexible material such as silicon.

The timing gear 221 is connected to the driving roller 210, so that the timing gear 221 and the driving roller 210 may rotate together as the rotation axis of the timing gear 221 coincides with the rotation axis of the driving roller 210. The rotational force of the driving roller 210 is directly transmitted to the screen 200 because the driving roller 210 itself rotates rather than rotates by the movement of the screen. That is, the screen may receive the rotational force of the motor 220 through the timing belt 222 as well as through the driving roller 210.

The surface of the driving roller 210 may be coated with the material with the high friction such that the rotational force of the driving roller 210 is transmitted to the screen 200. For example, the silicone or rubber material may be coated on the surface of the driving roller 210. The coated portion of the driving roller 210 may have a thickness corresponding to thicknesses of the timing gear 221 and the timing chain 223 such that the screen 200 is not wrinkled.

The auxiliary roller 325 disposed side by side with the driving roller 210 may be further included to prevent the screen 200 from wrinkling and allow the screen 200 to move along with the rotation of the driving roller 210 without being pushed.

The auxiliary roller 325 extends in the direction parallel to the driving roller 210, and the screen 200 passes through the space between the auxiliary roller 325 and the driving roller 210. The auxiliary roller 325 may rotate in the direction opposite to the rotation direction of the driving roller 210 to move the screen 200, and include the coated portion made of the elastic material like the driving roller 210 for the frictional force with the screen 200. The auxiliary roller 325 holds the screen 200 to be in close contact with the driving roller 210, so that the screen 200 may move in close contact with the driving roller 210 without being lifted or sliding.

The motor 220 may be placed at a position that coincides with a position of the rotation axis of the timing gear 221, but when there is not enough space to be disposed in the lateral direction as shown in FIG. 16, the motor 220 may be disposed adjacent to the timing gear 221 and may transmit the rotational force to the timing gear 221 using a spur gear 224. A second spur gear 2242 that received a rotational force of a first spur gear 2241 coupled to the motor 220 rotates in a direction opposite to a rotation direction of the first spur gear 2241, and the timing gear 221 is coupled to rotate around the same rotation axis as the second spur gear 2242.

Therefore, the timing gear 221 rotates in a direction opposite to the rotation direction of the motor 220. In order to match the rotation period of the auxiliary roller 325 with the rotation period of the driving roller 210, the rotational force may be provided to the auxiliary roller 215 by further including the second spur gear 2242 rotating together with the driving roller 210 and a third spur gear 2243 coupled to the auxiliary roller 325.

A pair of timing chains 223 may be located on the both sides in the horizontal direction of the screen 200. The timing gears 221 may be coupled to the both sides of the driving roller 210, so that one motor 220 may drive two timing gears 221.

In order for the timing chain 223 to be located on the rear surface of the art wall 150, the timing chain 223 should be located closer to the rear surface of the smart wall 100 than the first region 200a of the screen. Because it is possible to provide a screen wall with a neater appearance, it is preferable that the art wall 150 and the screen 200 are arranged in the same plane.

A diameter of the timing gear 221 may be smaller than a diameter of the driving roller 210 on which the screen is wound such that the timing chain 223 is located rearwardly of the first region 200a of the screen 200 (at least as much as a thickness of the art wall). However, in this case, a moving distance of the timing chain 223 wound around the timing gear 221 and a moving distance of the screen wound around the driving roller 210 may become different.

The number of rotations of the timing gear 221 and the driving roller 210 may be different in inverse proportion to a diameter ratio of the timing gear 221 and the driving roller 210 such that the moving distances of the timing chain 223 and the screen 100 are the same. Assuming that a radius R1 of a portion of the driving roller 210 where the screen is wound has a value a times larger than a radius R2 of the timing gear 221 (R1=a*R2), the number of rotations f2 of the timing gear 221 needs to a times greater than the number of rotations f1 of the driving roller 210 (f2=a*f1). For example, when R1 has a value 10% greater than R2 (R1=1.1*R2), f2 needs to be 10% greater than f1 (f2=1.1*f1).

Figure 17:
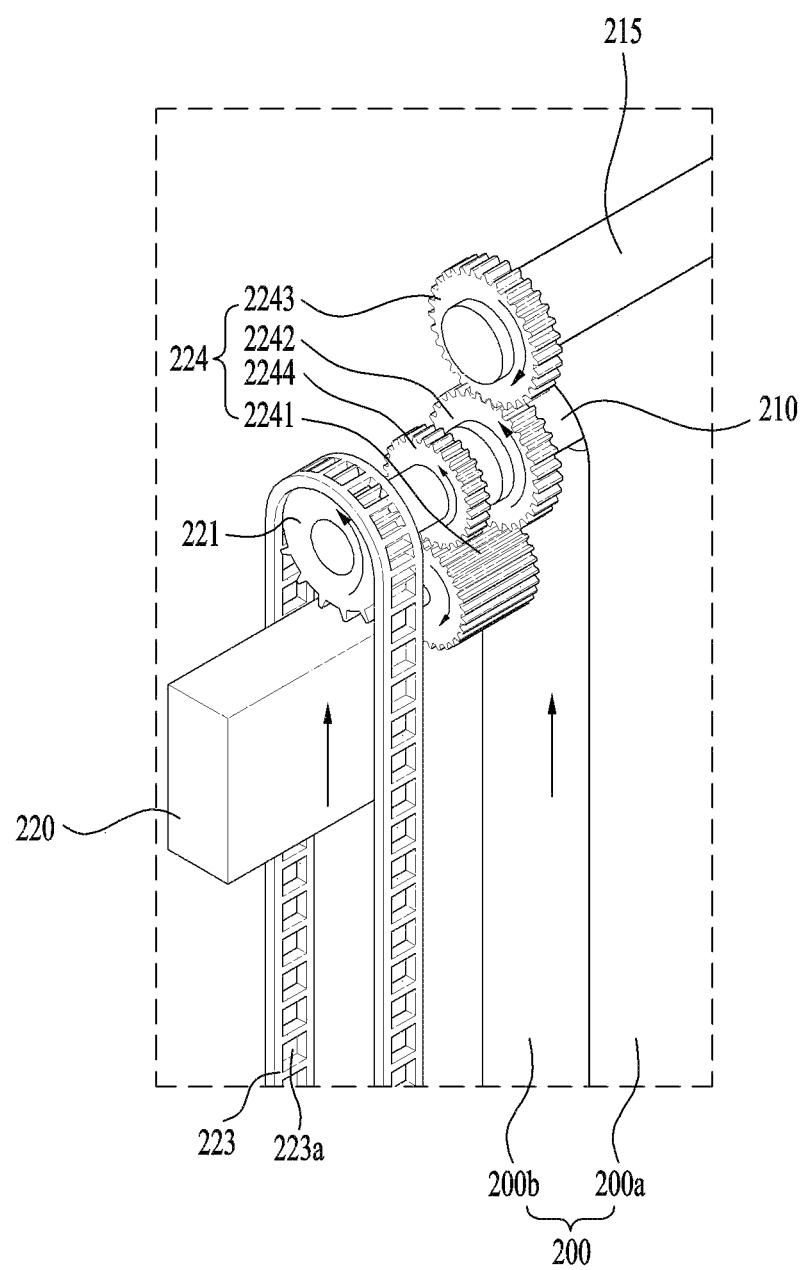
FIG. 17 is a view illustrating a driver of a smart wall according to another embodiment of the present disclosure.

FIG. 17 is a view showing the driver of the smart wall 100 according to another embodiment of the present disclosure. The present embodiment is characterized in that a fourth spur gear 2244 is further added to solve the problem that occurs when the diameters of the driving roller 210 and the timing gear 221 are different as described above. The fourth spur gear 2244 with a smaller number of teeth because of a smaller diameter than the second spur gear 2242 connected to the driving roller 210 may be added, and the timing gear 221 may be connected to the fourth spur gear 2244 to increase the number of rotations of the timing gear 221 to be greater than that of the second spur gear 2242. For example, when the diameter of the driving roller 210 is a times larger than the diameter of the timing gear 221, the number of rotations of the timing gear 221 is a times greater than the number of rotations of the driving roller 210, and as a result, moving speeds of the timing chain 223 and the screen become the same.

Figure 18:
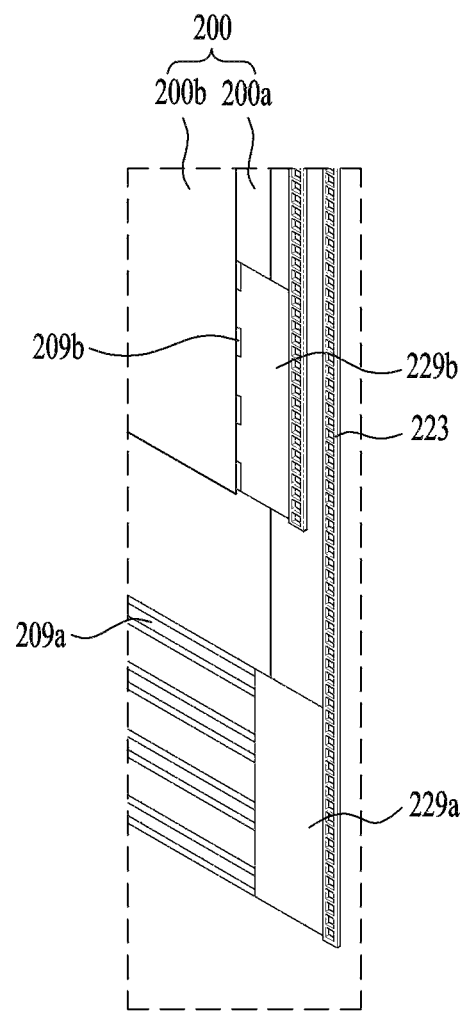
FIG. 18 is a view illustrating a timing chain and a connector of a screen according to another embodiment of the present disclosure.

FIG. 18 is a view of the screen 200 of the smart wall according to an embodiment of the present disclosure viewed from the rear. In order to keep the screen 200 in a flat unfolded state without being lifted, the screen 200 may further include the load beam 209 extending in the horizontal direction at the first lower portion that is the lower portion of the first region 200a positioned in front of the driving roller 210. The load beam 209 may pull the screen 200 downwards, so that the screen 200 may be flattened without the lower portion thereof being lifted. The plurality of load beams 209 may be disposed as needed to pull the screen 200 with the appropriate force.

Because the load beam 209 extends in the horizontal direction, the bending in the horizontal direction may be minimized by the driving roller 210 at the upper portion and the load beam 209 at the lower portion. The load beam 209 may further reinforce the horizontal rigidity by defining the groove extending in the horizontal direction as shown in FIG. 18 for the rigidity.

Because of not being able to be wound on the driving roller 210, the portion where the load beam 209 is located is always located on the front surface of the display device 161. The load beam 209 may also be disposed in the second region for balancing the forces of the first region and the second region.

When a connector 229 for connecting the timing chain 223 and the screen 200 to each other is coupled only to one of the first region and the second region of the screen, the load beam 209 may be disposed in the other of the second region 200b and the first region 200a to achieve balance of a force against a pulling force of the connector 229.

Alternatively, as shown in FIG. 18, in order to uniformly provide a force to both of the first region 200a and the second region 200b, both a first connector 229a coupled to the first lower portion of the first region 200a and a second connector 229b coupled to a second lower portion of the second region 200b may be included. In addition, the load beam 209 may also include both a first load beam 209a coupled to the first lower portion and a second load beam 209b coupled to the second lower portion to maintain the balance of the force between the first region 200a and the second region 200b.

Figure 19:
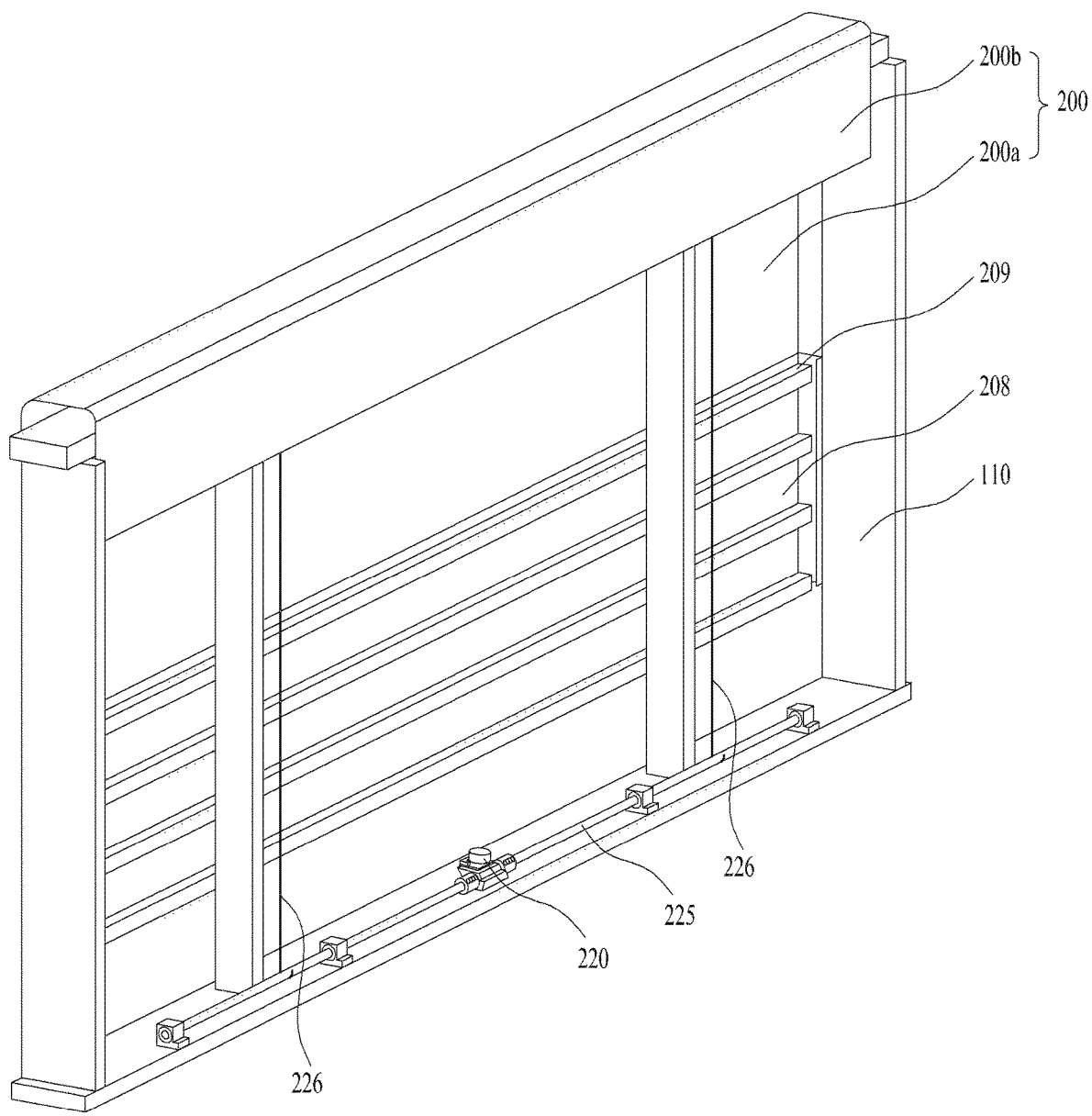
FIG. 19 is a view illustrating a screen and a driver disposed on a frame structure of a smart wall according to another embodiment of the present disclosure.
Figure 20:
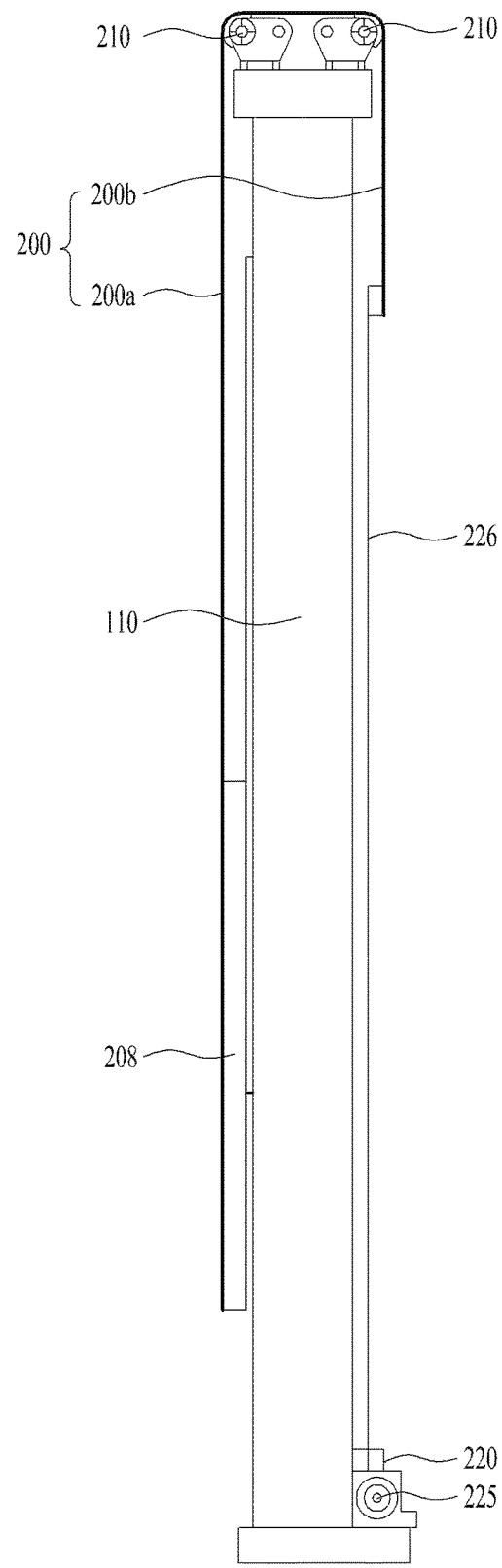
FIG. 20 is a view of a structure in FIG. 19 viewed from the side.

FIG. 19 is a view illustrating the screen 200 and the driver disposed on the frame structure 110 of the smart wall 100 according to an embodiment of the present disclosure, and FIG. 20 is a view of the structure in FIG. 19 viewed from the side. The driving roller 210 located on one side of the mounting cell may extend in the horizontal direction, and may use one driving roller 210. Alternatively, as shown in FIG. 20, a pair of driving rollers 210 may be arranged side by side in a front and rear direction of the screen 200. When a plurality of driving rollers 210 are arranged as shown in FIG. 20, a space between the first region 200a and the second region 200b of the screen 200 may be widened. It is possible to secure enough space for the display device 161 to be mounted without greatly increasing the diameter of the driving roller 210.

The portion (the first region 200a) of the screen 200 may be located on the front surface of the display device 161 and the portion (the second region 200b) of the screen 200 may be located on the rear surface of the display device 161 by winding the screen 200 half a turn on the driving roller 210. FIG. 19 is a view of the frame structure 110 viewed from the rear. The first region 200a located on a side viewed by the user is located on a rear surface in the drawing, and the second region 200b located on the rear surface of the display device 161 is located on a front surface in the drawing.

When the area of the second region 200b of the screen 200 located on the rear surface of the display device 161 is increased, the area of the first region 200a of the screen 200 located on the front surface of the display device 161 is reduced, so that the region exposed through the front surface of the display device 161 may be adjusted by adjusting the areas of the portions of the screen 200 located on the front and rear surfaces.

The motor of the present disclosure may be directly connected to the driving roller 210 and transmit the force to the screen 200 without rotating the driving roller 210, so that the screen 200 may move upwards and downwards, and thus the driving roller 210 may rotate.

As shown in FIG. 19, the screen 200 may be moved in the vertical direction using a wire 226 having one end connected to the second lower portion of the second region 200b. The motor 220 is located at a bottom of the mounting cell and the other end of the wire 226 is connected to a rotating portion 225 that rotates when the motor 220 is driven. The wire 226 may control a vertical movement of the second region 200b of the screen 200 while being wound and unwound around the rotating portion 225 based on the rotation of the rotating portion 225.

A plurality of wires 226 may be disposed in the horizontal direction such that both sides of the screen 200 move uniformly without being tilted. The rotating portion 225 connected to the motor 220 may be formed to be long as shown in FIG. 19 to simultaneously pull or loosen the plurality of wires 226.

When the wire 226 is wound around the rotating portion 225, as the second lower portion moves downwards, the area of the first region 200a is reduced and the area of the second region 200b is increased. Conversely, when the wire 226 is unwound, as the area of the first region 200a increases, the front surface of the display device 161 is sequentially covered.

In order to assist the movement of the screen 200 in the direction in which the area of the first region 200a increases, as shown in FIG. 19, the load beam 209 may be further disposed in the first lower portion of the first region 200a. A material with a large weight, such as metal, may be used for the load beam 209, and the load beam 209 may provide a force of pulling the first region 200a downwards. That is, when the motor 220 is driven in the direction in which the wire 226 is unwound from the rotating portion 225, the first lower portion of the first region 200a of the screen 200 may naturally move downwards.

Because the load beam 209 extends in the horizontal direction, the bending in the horizontal direction may be minimized by the driving roller 210 at the upper portion and the load beam 209 at the lower portion. It is possible to further reinforce the horizontal rigidity by defining the horizontally extending groove in the load beam 209. The plurality of load beams 209 may be disposed as needed to pull the screen 200 with the appropriate force.

Figure 21:
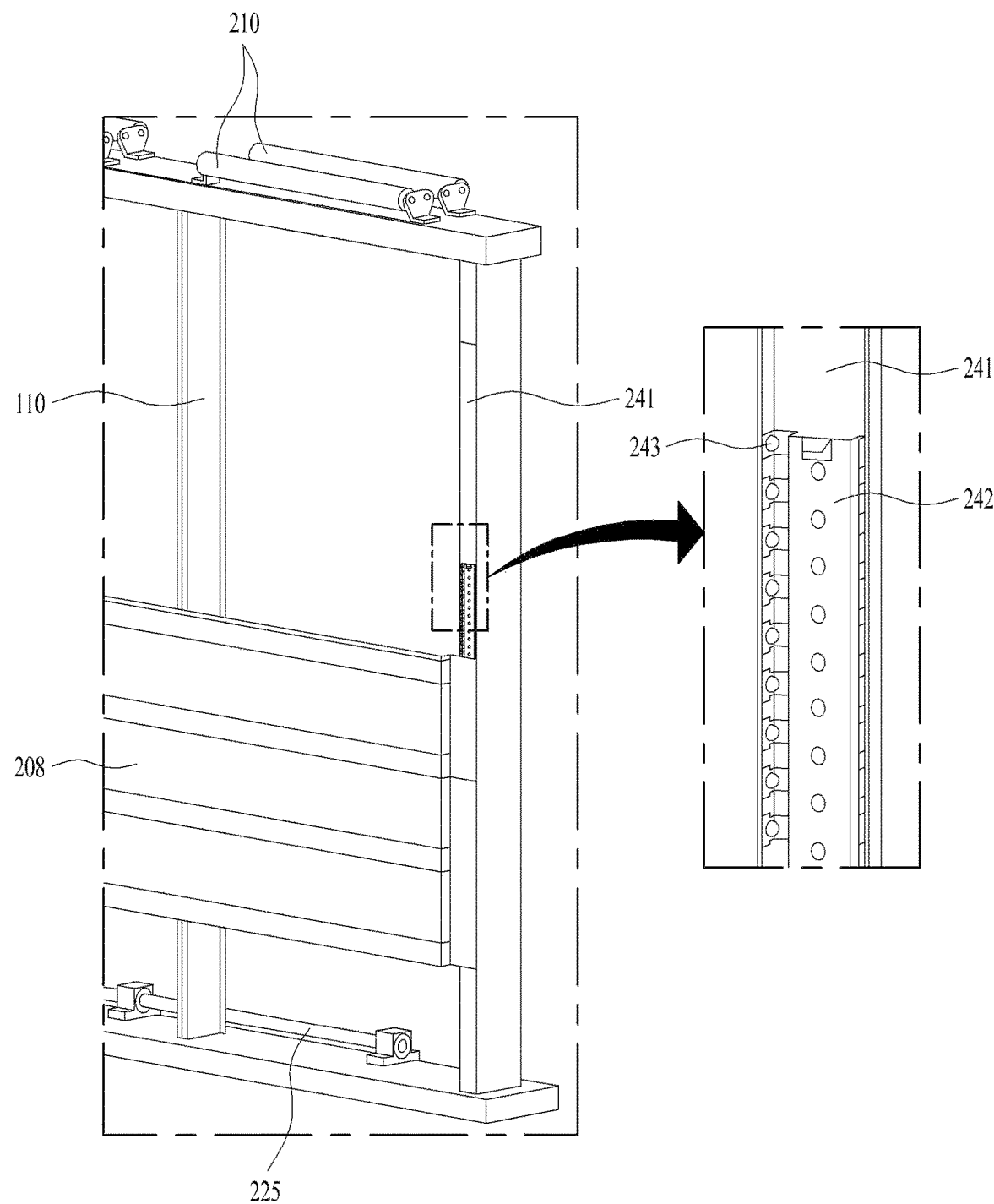
FIG. 21 is a view illustrating a driver of a screen according to another embodiment of the present disclosure.

FIG. 21 is a view illustrating the driver of the screen 200 according to an embodiment of the present disclosure. A slide member may be used to assist with the movement of the screen 200 of the present disclosure. A rail 241 coupled to a vertical frame of the frame structure 110 may extend in the vertical direction, and a bearing 242 moving along the rail 241 may be coupled to the screen 200.

As the bearing 242 moves only in the vertical direction along the rail 241 and is blocked from moving in the lateral direction or in the front and rear direction, the screen 200 may be prevented from shaking or being lifted in the lateral direction. A member capable of reducing a frictional force, such as a ball 243, may be interposed between the bearing 242 and the rail 241. The bearing 242 may be coupled to the first region 200a of the screen 200 to assist the first region 200a exposed to the user to move in the vertical direction without distortion.

A screen bracket 208 located in the first lower portion of the screen 200 may be further included, and the bearing 242 may be fastened to the screen bracket 208. The above-described load beam may be coupled to the screen bracket 208.

When the first region 200a of the screen 200 moves upwards and the front surface of display device 161 is opened, the rail 241 may be positioned on the rear surface of the art wall such that the rail 241 is not exposed to the front surface. In order to fasten the rail 241 and the bearing 242 moving on the rail 241 that do not overlap with screen 200 in the front and rear direction with the first region 200a of the screen 200, the screen bracket 208 may include a wing portion 208b extending in the lateral direction of the screen 200. The bearing 242 may be fastened to the wing portion 208b, and the wing portion 208b of the screen bracket 208 may form a step 208c with a main body 208aa coupled to the first lower portion of the screen 200 as shown in FIG. 21 to be positioned on the rear surface of the art wall.

The wing portion 208b and the rail 241 may not be exposed to the user when the art wall is located on front surfaces of the wing portion 208b, the rail 241, and the like, and the step 208c may be formed such that the art wall and the screen 200 form the same plane.

Figure 22:
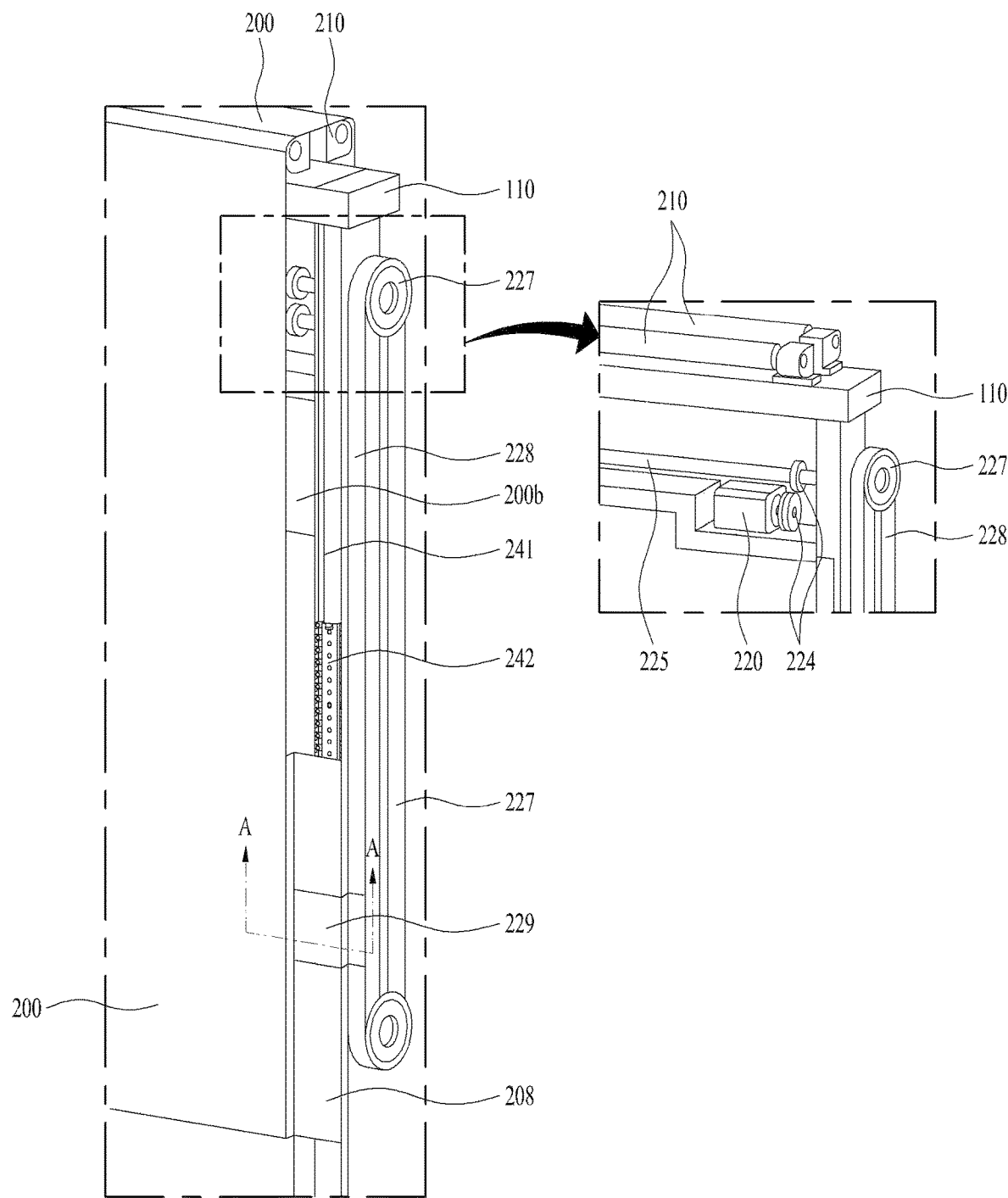
FIG. 22 is a view illustrating a driver of a screen according to another embodiment of the present disclosure.

FIG. 22 is a view illustrating the driver of the screen 200 according to another embodiment of the present disclosure, and FIG. 23 is a view illustrating a closed band 228 and a fastener 229 of the screen 200 according to another embodiment of the present disclosure. In addition to the method of moving the screen 200 in the vertical direction using the wire 226 described above, a rotary pulley 227 and the closed band 228 may be used as shown in FIG. 22.

A pair of rotary pulleys 227 are arranged in the vertical direction, and the closed band 228 forms a closed curve as both ends thereof are in contact with each other, and is coupled with the rotary pulleys 227 to surround the pair of rotary pulleys 227. The pair of rotary pulleys are arranged in the lateral direction of the screen, that is, in a direction perpendicular to the screen as shown in FIG. 22, and the closed band includes a front portion, like the screen, and a rear portion with respect to the rotary pulley. The closed band 228 moves in the vertical direction when the rotary pulley 227 rotates, and moving directions of the front portion and the rear portion of the closed band 228 with respect to the rotary pulley are opposite.

The motor 220 for transmitting the power to the rotary pulley 227 may be included as shown in FIG. 22. The pair of rotary pulleys 227 may be respectively disposed on the both sides of the screen 200 to uniformly provide the force to the both sides of the screen 200. In order to transmit the power of one motor 220 to the pair of rotary pulleys 227, the rotating portion 225 connected to the pair of rotary pulleys 227 may be used. The rotational force of the motor 220 may be transmitted to the rotating portion 225 using the spur gear 224, and when the rotating portion 225 rotates, the pair of rotary pulleys 227 may rotate at the same time. First teeth may be formed on a surface of the rotary pulley 227 and second teeth may be formed on an inner surface of the closed band 228 facing the rotary pulley 227 as shown in (a) in FIG. 23 such that the rotary pulley 227 rotates at a correct timing without being pushed during the rotation.

The screen 200 may move in the vertical direction by being coupled with the closed band 228 to control an exposure degree of the display device 161. The closed band 228 may be fastened to the aforementioned screen bracket 208, and in particular, to the wing portion 208b of the screen bracket 208 extending laterally.

Referring to (a) in FIG. 23, the fastener 229 may include a first bracket 229a coupled to the screen 200 and located on one side of the closed band 228, and a second bracket 229b coupled to the other side of closed band 228 and disposed opposite to the first bracket 229a. The movement of the closed band 228 and the movement of the screen 200 may be synchronized by fastening the first bracket 229a and the second bracket 229b with a screw. Because there are the teeth on the inner surface of the closed band 228, the second bracket 229b may have irregularities corresponding to the second teeth.

As shown in (b) in FIG. 23, one side of the first bracket 229a may be fastened to the wing portion 208b of the screen bracket 208 and the other side thereof may be fastened to the second bracket 229b and coupled with the closed band 228. One surface of the screen bracket 208 may be fastened to the bearing 242 described above, and the other surface thereof may be fastened to the first bracket 229a to control the vertical movement of the screen 200.

When only the first region 200a of the screen 200 is fastened, the movement of the second region 200b may occur irregularly, so that, as the second region 200b may also be fastened with the closed band 228, the screen 200 may move in the vertical direction at the same speed as a moving speed of the closed band 228.

The rotary pulley 227 and the closed band 228 may provide the power to move the screen 200 in the vertical direction, and the rail 241 and the bearing 242 may guide the screen 200 to move in the vertical direction without shaking in the front and rear direction or in the left and right direction. The above embodiments should be construed in all aspects as illustrative and not restrictive. The scope of the disclosure should be determined by the appended claims and their legal equivalents, and all changes coming within the meaning and equivalency range of the appended claims are intended to be embraced therein.

The invention claimed is:

1. A smart wall comprising:
a frame structure having a mounting cell defined therein;
a display device disposed in the mounting cell;
a driving roller positioned at an upper portion of the mounting cell;
a screen including a first lower portion wound around the driving roller and positioned in front of the display device and a second lower portion positioned at the rear of the display device;
a motor for moving the screen wound around the driving roller;
a timing gear rotating by receiving a rotational force of the motor and including first teeth on an outer surface thereof;
a timing chain including holes defined therein respectively corresponding to the first teeth; and
a connector for connecting the timing chain and the screen to each other,
wherein the screen includes:
a first fabric; and
a metal mesh positioned on a first surface of the first fabric and including a plurality of mesh holes extending long in a horizontal direction.

2. The smart wall of claim 1, further comprising:
a timing belt coupled to a first surface of the screen in contact with the driving roller and including second teeth engaged with the first teeth.

3. The smart wall of claim 1, further comprising an auxiliary roller adjacent to the driving roller and extending in a direction parallel to the driving roller,
wherein the screen passes through a space defined between the driving roller and the auxiliary roller.

4. The smart wall of claim 1, wherein the mesh holes are arranged in an array in the horizontal direction and a vertical direction, and
wherein two vertically adjacent mesh holes are staggered.

5. The smart wall of claim 1, wherein an end of the first fabric surrounds an end of the metal mesh and is directed to face a first surface of the metal mesh.

6. The smart wall of claim 1, wherein the screen further includes a second fabric located on a first surface of the metal mesh.

7. The smart wall of claim 1, wherein the timing gear is coupled to the driving roller and rotates together with the driving roller.

8. The smart wall of claim 7, further comprising a spur gear for transmitting the rotational force of the motor to the driving roller and the timing gear.

9. The smart wall of claim 1, wherein the connector is fastened to the second lower portion, and
wherein the smart wall further includes a load beam coupled to the first lower portion.

10. The smart wall of claim 1, wherein the connector includes a first connector fastened to the first lower portion and a second connector fastened to the second lower portion.

11. The smart wall of claim 1, wherein a diameter of a portion of the driving roller in contact with the screen is a times larger than a diameter of the timing gear, and
wherein the number of rotations of the timing gear is a times greater than the number of rotations of the driving roller.

12. The smart wall of claim 11, further comprising an art wall being flush with the first lower portion of the screen and located next to the screen,
wherein the timing chain is located on a rear surface of the art wall.

13. The smart wall of claim 1, further comprising:
a rail coupled to the frame structure and extending in a vertical direction; and
a bearing inserted into the rail to move along the rail in the vertical direction and fastened with the first lower portion of the screen,
wherein, when the driving roller rotates, the first lower portion of the screen moves in the vertical direction and the bearing moves in the vertical direction along the rail.

14. The smart wall of claim 13, further comprising a screen bracket coupled to the first lower portion of the screen,
wherein the screen bracket further includes a wing portion extending in a lateral direction from the screen, and
wherein the bearing is coupled to the wing portion of the screen bracket.

15. The smart wall of claim 14, wherein the wing portion extends to form a step rearwardly from a main body coupled to the first lower portion of the screen, and
wherein the smart wall further includes an art wall located next to the screen and covering the wing portion and the rail.

16. The smart wall of claim 13, further comprising:
a wire having one end coupled to the second lower portion of the screen; and
a rotating portion rotating by receiving a driving force of the motor, wherein the other end of the wire is wound around the rotating portion,
wherein the wire and the rotating portion respectively include a plurality of wires and a plurality of rotating portions spaced apart from each other in a horizontal direction, and wherein the motor provides a rotational force to the plurality of rotating portions at the same time.

17. The smart wall of claim 13, further comprising:
a pair of rotary pulleys coupled to the frame structure, arranged in the vertical direction, and rotating by receiving a driving force of the motor; and
a closed band having both ends respectively fitted with the pair of rotary pulleys,
wherein the screen includes a fastener for fastening the closed band to at least one of the first lower portion and the second lower portion,
wherein, when the motor is driven, as the rotary pulley rotates and the closed band moves, the screen moves in the vertical direction.

18. The smart wall of claim 17, wherein each of the pair of rotary pulleys includes first teeth protruding from an outer surface thereof,
wherein the closed band includes second teeth engaged with the first teeth.

19. The smart wall of claim 18, wherein the fastener includes:
a first bracket coupled to one surface of the closed band;
a second bracket coupled to the other surface of the closed band having the second teeth formed thereon; and
a fastening screw for fastening the first bracket and the second bracket to each other through the first bracket and the second bracket,
wherein the second bracket further includes irregularities corresponding to a shape of the second teeth.

20. A smart wall comprising:
a frame structure having a mounting cell defined therein;
a display device disposed in the mounting cell;
a driving roller positioned at an upper portion of the mounting cell;
a screen including a first lower portion wound around the driving roller and positioned in front of the display device and a second lower portion positioned at the rear of the display device;
a motor for moving the screen wound around the driving roller;
a timing gear rotating by receiving a rotational force of the motor and including first teeth on an outer surface thereof;
a timing chain including holes defined therein respectively corresponding to the first teeth; and
a connector for connecting the timing chain and the screen to each other.

21. The smart wall of claim 20, wherein the timing chain contains a ductile material.

22. The smart wall of claim 20, wherein the timing gear is coupled to the driving roller and rotates together with the driving roller.

23. The smart wall of claim 22, wherein the timing gear includes a pair of timing gears to be respectively coupled to both ends of the driving roller, and
wherein the timing chain includes a pair of timing chains on both sides in a horizontal direction of the screen.

24. The smart wall of claim 22, further comprising a spur gear for transmitting the rotational force of the motor to the driving roller and the timing gear.

25. The smart wall of claim 20, wherein the connector is fastened to the second lower portion, and
wherein the smart wall further includes a load beam coupled to the first lower portion.

26. The smart wall of claim 20, wherein the connector includes a first connector fastened to the first lower portion and a second connector fastened to the second lower portion.

27. The smart wall of claim 20, wherein a diameter of a portion of the driving roller in contact with the screen is a times larger than a diameter of the timing gear, and
wherein the number of rotations of the timing gear is a times greater than the number of rotations of the driving roller.

28. The smart wall of claim 27, further comprising an art wall being flush with the first lower portion of the screen and located next to the screen,
wherein the timing chain is located on a rear surface of the art wall.

29. A smart wall comprising:
a frame structure having a mounting cell defined therein;
a display device disposed in the mounting cell;
a driving roller positioned at an upper portion of the mounting cell;
a screen including a first lower portion wound around the driving roller and positioned in front of the display device and a second lower portion positioned at the rear of the display device; and
a motor for moving the screen wound around the driving roller,
wherein the screen includes:
a first fabric; and
a metal mesh positioned on a first surface of the first fabric and including a plurality of mesh holes extending long in a horizontal direction;
a rail coupled to the frame structure and extending in a vertical direction; and
a bearing inserted into the rail to move along the rail in the vertical direction and fastened with the first lower portion of the screen,
wherein, when the driving roller rotates, the first lower portion of the screen moves in the vertical direction and the bearing moves in the vertical direction along the rail,
a pair of rotary pulleys coupled to the frame structure, arranged in the vertical direction, and rotating by receiving a driving force of the motor; and
a closed band having both ends respectively fitted with the pair of rotary pulleys,
wherein the screen includes a fastener for fastening the closed band to at least one of the first lower portion and the second lower portion,
wherein, when the motor is driven, as the rotary pulley rotates and the closed band moves, the screen moves in the vertical direction,
wherein each of the pair of rotary pulleys includes first teeth protruding from an outer surface thereof,
wherein the closed band includes second teeth engaged with the first teeth, and
wherein the fastener includes:
a first bracket coupled to one surface of the closed band;
a second bracket coupled to the other surface of the closed band having the second teeth formed thereon; and
a fastening screw for fastening the first bracket and the second bracket to each other through the first bracket and the second bracket,
wherein the second bracket further includes irregularities corresponding to a shape of the second teeth.

* * * * *